US012425773B2

(12) United States Patent
Lee et al.

(10) Patent No.: US 12,425,773 B2
(45) Date of Patent: Sep. 23, 2025

(54) ELECTRONIC DEVICE INCLUDING ACOUSTIC ACTUATOR

(71) Applicant: SAMSUNG ELECTRONICS CO., LTD., Suwon-si (KR)

(72) Inventors: Hunki Lee, Suwon-si (KR); Seongkwan Yang, Suwon-si (KR); Myoungsung Sim, Suwon-si (KR); Choonghyo Park, Suwon-si (KR); Jihoon Song, Suwon-si (KR); Taeeon Kim, Suwon-si (KR); Byounghee Lee, Suwon-si (KR); Woojin Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 17/994,971

(22) Filed: Nov. 28, 2022

(65) Prior Publication Data
US 2023/0086602 A1 Mar. 23, 2023

Related U.S. Application Data

(63) Continuation of application No. PCT/KR2021/006504, filed on May 25, 2021.

(30) Foreign Application Priority Data

May 27, 2020 (KR) .................. 10-2020-0063636

(51) Int. Cl.
*H04R 7/04* (2006.01)
*G06F 1/16* (2006.01)
(Continued)

(52) U.S. Cl.
CPC ........... *H04R 7/045* (2013.01); *G06F 1/1605* (2013.01); *G06F 3/016* (2013.01); *H04R 1/025* (2013.01);
(Continued)

(58) Field of Classification Search
CPC .... H04R 7/045; H04R 1/025; H04R 2400/03; H04R 2499/15; G06F 1/1605; G06F 3/016
See application file for complete search history.

(56) References Cited

U.S. PATENT DOCUMENTS

2011/0260843 A1 10/2011 Woo et al.
2012/0243719 A1 9/2012 Franklin et al.
(Continued)

FOREIGN PATENT DOCUMENTS

JP 2004343362 A 12/2004
JP 2005244804 A 9/2005
(Continued)

OTHER PUBLICATIONS

International Search Report and Written Opinion for International Application No. PCT/KR2021/006504; International Filing Date May 25, 2021; Date of Mailing Aug. 30, 2021; 62 Pages.
(Continued)

*Primary Examiner* — Andrew Sniezek
(74) *Attorney, Agent, or Firm* — CANTOR COLBURN LLP

(57) ABSTRACT

An electronic device includes a display, a bracket for supporting at least a part of the display, and an acoustic actuator. The acoustic actuator is arranged under the display and includes a vibrating portion for transferring waves to the display and a fixed portion of which at least a part is fixed by the bracket. and the electronic device further includes at least one recess structure of which at least a part is arranged to be spaced from the acoustic actuator. The recess structure is formed to have an acoustic impedance that differs from the acoustic impedance of the bracket which is adjacent to the recess structure.

19 Claims, 15 Drawing Sheets

(51) Int. Cl.
*G06F 3/01* (2006.01)
*H04R 1/02* (2006.01)

(52) U.S. Cl.
CPC ...... *H04R 2400/03* (2013.01); *H04R 2499/15* (2013.01)

(56) References Cited

U.S. PATENT DOCUMENTS

| | | |
|---|---|---|
| 2017/0280215 A1 | 9/2017 | Lee et al. |
| 2017/0280249 A1 | 9/2017 | Choi et al. |
| 2018/0317000 A1 | 11/2018 | Ham et al. |
| 2019/0052963 A1 | 2/2019 | Choi et al. |
| 2019/0182370 A1 | 6/2019 | Lee et al. |
| 2019/0222920 A1 | 7/2019 | Harris et al. |
| 2020/0014999 A1 | 1/2020 | Ham et al. |
| 2023/0205259 A1* | 6/2023 | Kim ................ G06F 1/1605 361/679.01 |

FOREIGN PATENT DOCUMENTS

| | | |
|---|---|---|
| JP | 2018093468 A | 6/2018 |
| KR | 1020110118079 A | 10/2011 |
| KR | 1020140143236 A | 12/2014 |
| KR | 101704517 B1 | 2/2017 |
| KR | 101817102 B1 | 1/2018 |
| KR | 20180121293 A | 11/2018 |
| KR | 1020190061862 A | 6/2019 |
| KR | 1020190068936 A | 6/2019 |

OTHER PUBLICATIONS

Korean Office Action corresponding to Application No. 10-2020-0063636, Dated Nov. 15, 2024.

* cited by examiner

ELECTRONIC DEVICE INCLUDING ACOUSTIC ACTUATOR

CROSS-REFERENCE TO RELATED APPLICATION(S)

This application is continuation of International Application No. PCT/KR2021/006504, filed on May 25, 2021, which claims priority to Korean Patent Application No. 10-2020-0063636 filed on May 27, 2020 in the Korean Intellectual Property Office, the disclosures of which are herein incorporated by reference.

BACKGROUND

1. Field

Various embodiments of the disclosure relate to an electronic device including an acoustic actuator.

2. Description of Related Art

Along with the remarkable development of information and communication technology and semiconductor technology, the proliferation and use of various electronic devices have been rapidly increasing. Particularly, the recent development trend of electronic devices is toward communication with portability.

An electronic device may refer to a device that performs a specific function according to a loaded program, such as an electronic notebook, a portable multimedia player, a mobile communication terminal, a tablet PC, a video/audio device, a desktop/laptop computer, or a vehicle navigation device as well as a home appliance. For example, these electronic devices may output stored information as sound or an image. As the integration level of electronic devices increases and high-speed and large-capacity wireless communication becomes common, a single electronic device such as a mobile communication terminal may be equipped with various functions in recent years. For example, entertainment functions such as games, multimedia functions such as music/video playback, communication and security functions for mobile banking, schedule management, or an electronic wallet function as well as communication functions may be integrated into a single electronic device. Such electronic devices are being miniaturized so that users may conveniently carry them.

SUMMARY

In general, an electronic device adopting sound on display (SOD) may provide sounds to a user without a separate speaker module by using a display panel instead of a diaphragm. In the electronic device, although waves generated from an acoustic actuator propagate into the air through a display surface, some waves may propagate to a bracket of the electronic device and then propagate into the air through the display surface. The difference between the phase of a sound propagated directly through the display surface without propagating to the bracket and the phase of a sound propagated through the display surface after propagating to the bracket may cause destructive interference, thereby lowering a sound pressure level.

An electronic device according to various embodiments of the disclosure may be implemented to prevent a sound wave propagating through a display surface from lowering a sound pressure level due to destructive interference in order to improve the performance of a sound on display (SOD) technology.

An electronic device according to various embodiments of the disclosure may reduce the amplitude of an acoustic wave propagated to a bracket and then through a display surface by disposing a recess structure in a propagation path of a wave generated from an acoustic actuator, According to various embodiments of the disclosure, an electronic device may include a display, a bracket supporting at least part of the display, and an acoustic actuator disposed under the display. The electronic device further includes a vibration part and a recess structure. The vibration part transmits waves to the display and a fixed part at least partially fixed by the bracket. The recess structure is disposed in the path of the waves and is at least partially spaced apart from the acoustic actuator. The recess structure is formed to have an acoustic impedance different from an acoustic impedance of the bracket adjacent to the recess structure.

According to various embodiments of the disclosure, an electronic device includes a display, a metal bracket supporting at least part of the display, and an acoustic actuator. The acoustic actuator is located in a first area of the metal bracket and is configured to transmit waves to the display. The electronic device further includes at least one recess structure spaced apart from the acoustic actuator and located in a portion of a second area formed to surround at least a portion of the first area of the metal bracket. The recess structure may be formed in a propagation path in which waves generated from the acoustic actuator are directed toward an edge of the metal bracket, and may suppress propagation of the generated waves to the edge of the metal bracket.

According to various embodiments of the disclosure, an electronic device may be provided, which adopts sound on display (SOD) increasing a sound pressure level.

According to various embodiments of the disclosure, an electronic device may suppress propagation of waves to a bracket by disposing a recess structure in a propagation path of waves generated from an acoustic actuator.

According to various embodiments of the disclosure, an electronic device may increase its acoustic performance by improving the features of a low sound pressure level in a specific frequency band, which is generated when SOD is applied.

According to various embodiments of the disclosure, an electronic device may be free of a space for a separate speaker module and improve the degree of freedom in mounting components of the electronic device by applying SOD.

DETAILED DESCRIPTION

Figure 1:
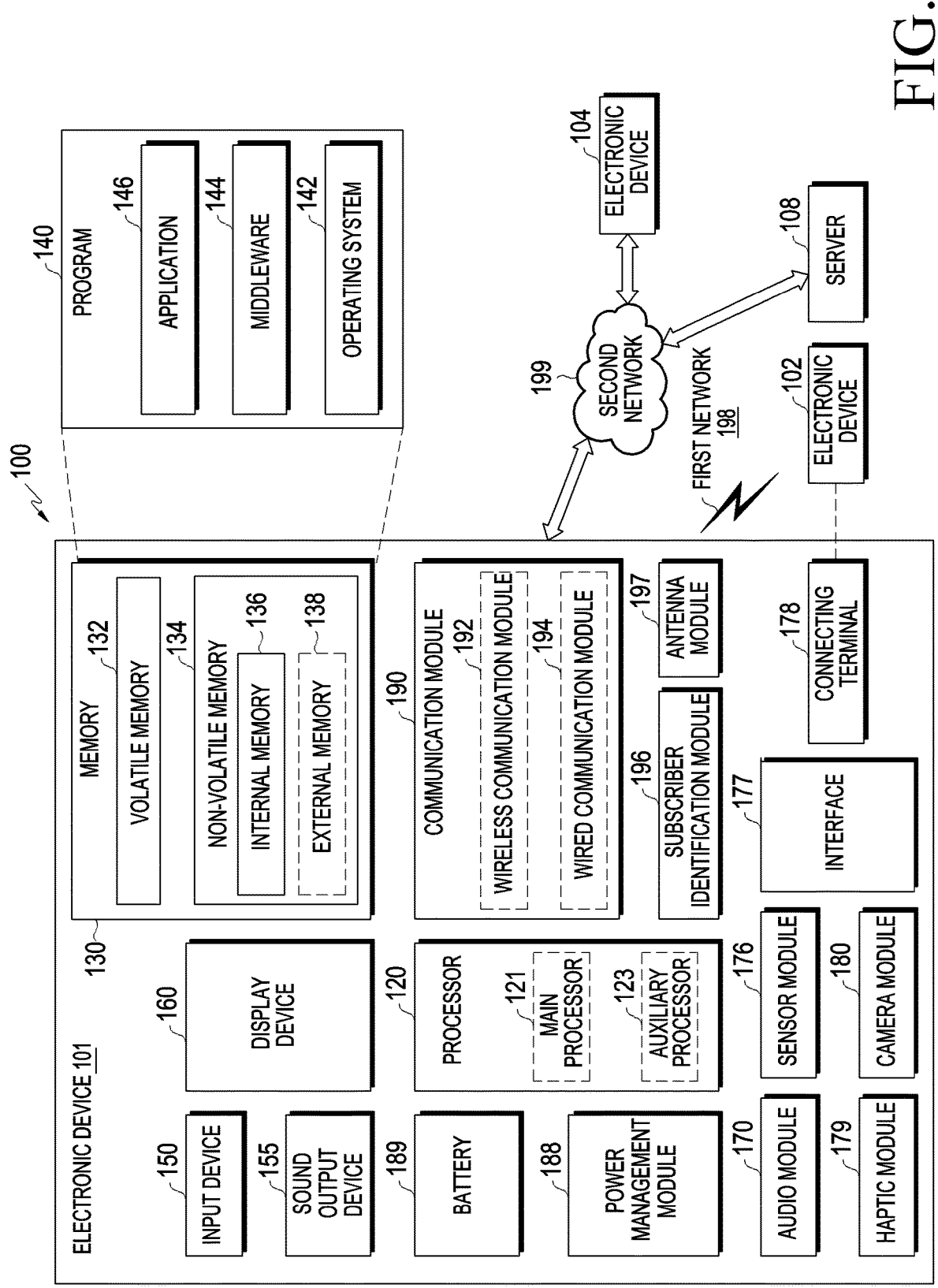
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
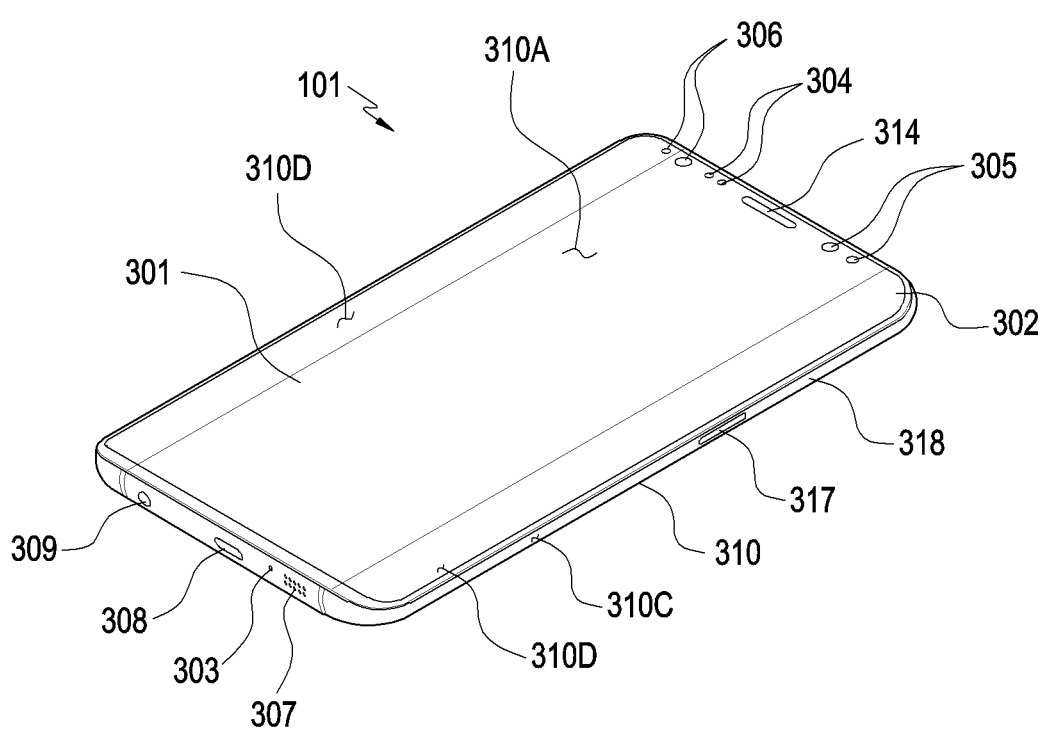
FIG. 2 is a front perspective view illustrating an electronic device according to various embodiments of the disclosure.
Figure 3:
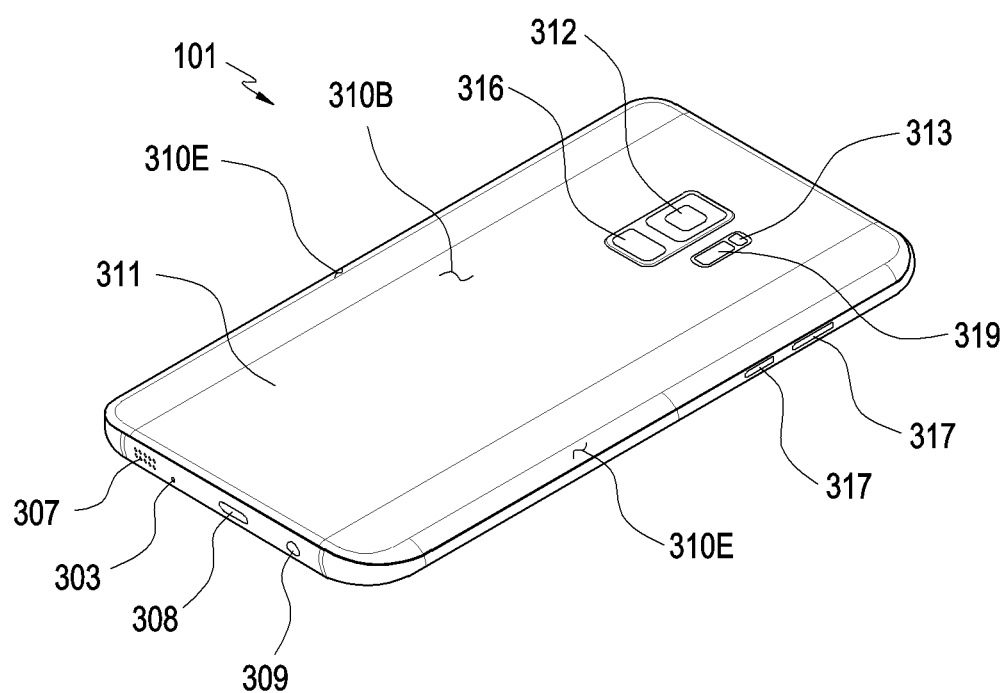
FIG. 3 is a rear perspective view illustrating the electronic device according to various embodiments of the disclosure.

FIG. 2 is a front perspective view illustrating an electronic device according to various embodiments of the disclosure. FIG. 3 is a rear perspective view illustrating the electronic device according to various embodiments of the disclosure.

Referring to FIGS. 2 and 3, the electronic device 101 according to an embodiment may include a housing 310 which includes a first surface (or front surface) 310A, a second surface (or rear surface) 310B, and side surfaces 310C surrounding a space between the first surface 310A and the second surface 310B. In another embodiment (not shown), the housing may refer to a structure that forms part of the first surface 310A, the second surface 310B, and the side surfaces 310C of FIG. 2. According to an embodiment, at least part of the first surface 310A may be formed by a front plate 302 (e.g., a glass plate or polymer plate) which is at least partially substantially transparent. The second surface 310B may be formed by a rear plate 311. The rear plate 311 may be formed of, for example, coated or tinted glass, ceramic, a polymer, a metal (e.g., aluminum, stainless steel (STS), or magnesium), or a combination of at least two of these materials. The side surfaces 310C may be coupled with the front plate 302 and the rear plate 311 and formed by a side bezel structure (or "side member") 318 including a metal and/or a polymer. In a certain embodiment, the rear plate 311 and the side bezel structure 318 may be integrally formed and include the same material (e.g., a metal material such as aluminum).

In the illustrated embodiment, the front plate 302 may include two first areas 310D bent and extending seamlessly from the first surface 310A toward the rear plate 311, at both ends of long edges of the front plate 302. In the illustrated embodiment (refer to FIG. 3), the rear plate 311 may include two second areas 310E bent and extending seamlessly from the second surface 310B toward the front plate 302 at both ends of long edges of the rear plate 311. In a certain embodiment, the front plate 302 (or the rear plate 311) may include only one of the first areas 310D (or the second areas 310E). In another embodiment, some of the first areas 310D or the second areas 310E may not be included. In the above embodiments, when viewed from a side of the electronic device 101, the side bezel structure 318 may have a first thickness (or width) on side surfaces without the first areas 310D or the second areas 310E, and a second thickness smaller than the first thickness on side surfaces with the first areas 310D or the second areas 310E.

According to an embodiment, the electronic device 101 may include one or more of a display 301, audio modules 303, 307, and 314 (e.g., the audio module 170 of FIG. 1), sensor modules 304, 316, and 319 (e.g., the sensor module 176 of FIG. 1), camera modules 305 and 312 (e.g., the camera module 180 of FIG. 1), key input devices 317 (e.g., the input device 150 of FIG. 1), light emitting elements 306, or connector holes 308 and 309. In a certain embodiment, the electronic device 101 may not be provided with at least one (e.g., the key input devices 317, the connector hole 309, or the light emitting elements 306) of the components or additionally include other components.

According to an embodiment, the display 301 may be visually exposed, for example, through a substantial portion of the front plate 302. In a certain embodiment, at least part of the display 301 may be exposed through the front plate 302 forming the first surface 310A and the first areas 310D of the side surfaces 310C. In a certain embodiment, the corners of the display 301 may be formed in the same shapes as those of adjacent peripheral portions of the front plate 302 on the whole. In another embodiment (not shown), the gap between the periphery of the display 301 and the periphery of the front plate 302 may be equal on the whole to increase the visually exposed area of the display 301.

According to an embodiment, a surface (or the front plate 302) of the housing 310 may include a view area formed by visual exposure of the display 301. For example, the view area may include the first surface 310A and/or the first areas 310D.

In another embodiment (not shown), a recess or an opening may be formed in part of the view area (e.g., the first surface 310A and the first areas 310D) of the display 301, and include at least one of the audio module 314, the sensor modules 304, the camera modules 305, or the light emitting elements 306, which are aligned with the recess or the opening. In another embodiment (not shown), at least one of the audio module 314, the sensor modules 304, the camera modules 305, a fingerprint sensor 316, or the light emitting elements 306 may be included on the rear surface of the view area of the display 301. In another embodiment (not shown), the display 301 may be incorporated with or disposed adjacent to a touch sensing circuit, a pressure sensor that measures the intensity (pressure) of a touch, and/or a digitizer that detects a magnetic field-based stylus pen. In a certain embodiment, at least some of the sensor modules 304 and/or at least some of the key input devices 317 may be disposed in the first areas 310D and/or the second areas 310E.

According to an embodiment, the audio modules 303, 307, and 314 may include, for example, a microphone hole 303 and speaker holes 307 and 314. A microphone for obtaining an external sound may be disposed in the microphone hole 303, and in a certain embodiment, a plurality of microphones may be disposed to detect the direction of a sound. The speaker holes 307 and 314 may include an external speaker hole 307 and a receiver hole 314 for calls. In a certain embodiment, the speaker holes 307 and 314 and the microphone hole 303 may be implemented as a single hole, or a speaker (e.g., a piezo speaker) may be included without the speaker holes 307 and 314. The audio modules 303, 307, and 314 may be designed in various manners such as installation of only some audio modules or addition of a new audio module according to the structure of the electronic device 101, not limited to the above structure.

According to an embodiment, the sensor modules 304, 316, and 319 may generate, for example, an electrical signal or data value corresponding to an internal operation state or external environmental state of the electronic device 101. The sensor modules 304, 316, and 319 may include, for example, first sensor modules 304 (e.g., a proximity sensor) disposed on the first surface 310A of the housing 310, a second sensor module (not shown) (e.g., a fingerprint sensor), a third sensor module 319 (e.g., a heart rate monitor (HRM) sensor) disposed on the second surface 310B of the housing 310, and/or a fourth sensor module 316 (e.g., a fingerprint sensor). In a certain embodiment (not shown), the fingerprint sensors may be disposed on the second surface 310B as well as on the first surface 310A (e.g., the display 301) of the housing 310. The electronic device 101 may further include a sensor module (not shown), for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor. The sensor modules 304, 316, and 319 may be designed in various manners such as installation of only some sensor modules or addition of a new sensor module according to the structure of the electronic device 101, not limited to the above structure.

According to an embodiment, the camera modules 305 and 312 may include, for example, a front camera module 305 disposed on the first surface 310A of the electronic device 101, and a second camera device 312 and/or a flash 313 disposed on the second surface 310B of the electronic device 101. Each of the camera modules 305 and 312 may include one or more lenses, an image sensor, and/or an image signal processor. The flash 313 may include, for example, a light emitting diode (LED) or a xenon lamp. In a certain embodiment, two or more lenses (an IR camera, a wide-angle lens, and a telephoto lens) and image sensors may be arranged on one surface of the electronic device 101. The camera modules 305 and 312 may be designed in various manners such as installation of only some camera modules or addition of a new camera module according to the structure of the electronic device 101, not limited to the above structure.

According to an embodiment, the electronic device 101 may include a plurality of camera modules (e.g., a dual camera or a triple camera) each having a different attribute (e.g., angle of view) or function. For example, a plurality of camera modules 305 and 312 including lenses having different angles of view may be configured, and the electronic device 101 may control to change of the angles of view of the camera modules 305 and 312 implemented in the electronic device 101 based on a user selection. For example, at least one of the plurality of camera modules 305 and 312 may be a wide-angle camera, and at least one other camera module may be a telephoto camera. Similarly, at least one of the plurality of camera modules 305 and 312 may be a front camera, and at least one other camera module may be a rear camera. Further, the plurality of camera modules 305 and 312 may include at least one of a wide-angle camera, a telephoto camera, or an IR camera (e.g., a time of flight (TOF) camera or a structured light camera). According to an embodiment, the IR camera may be operated as at least part of the sensor module. For example, the TOF camera may be operated as at least part of a sensor module (not shown) for detecting a distance to a subject.

According to an embodiment, the key input devices 317 may be arranged on side surfaces 310C of the housing 310. In another embodiment, the electronic device 101 may not include some or any of the above key input devices 317, and the key input devices 317 which are not included may be implemented in other forms such as soft keys on the display 301. In a certain embodiment, the key input devices may include the sensor module 316 disposed on the second surface 310B of the housing 310.

According to an embodiment, the light emitting elements 306 may be disposed, for example, on the first surface 310A of the housing 310. The light emitting elements 306 may provide, for example, state information about the electronic device 101 in the form of light. In another embodiment, the light emitting elements 306 may provide a light source interworking, for example, with an operation of the front camera module 305. The light emitting elements 306 may include, for example, an LED, an IR LED, and/or a xenon lamp.

According to an embodiment, the connector holes 308 and 309 may include a first connector hole 308 that may accommodate a connector (e.g., a universal serial bus (USB) connector) for transmitting and receiving power and/or data to and from an external electronic device, and/or a second connector hole 309 (e.g., an earphone jack) that may accommodate a connector for transmitting and receiving an audio signal to and from an external electronic device. The connector holes 308 and 309 may be designed in various manners such as installation of only some connector hole or addition of a new connector hole according to the structure of the electronic device 101, not limited to the above structure.

According to an embodiment, some camera module 305 among the camera modules 305 and 312 and/or some sensor module 304 among the sensor modules 304, 316, and 319 may be disposed to be exposed to the outside through at least part of the display 301. For example, the camera module 305 may include a punch hole camera disposed in a hole or recess formed on the rear surface of the display 301. According to an embodiment, the camera module 312 may be disposed inside the housing 310 such that a lens is exposed from the second surface 310B of the electronic device 101. For example, the camera module 312 may be disposed on a printed circuit board (e.g., a printed circuit board 340 of FIG. 4).

According to an embodiment, the camera module 305 and/or the sensor module 304 may be disposed from the internal space of the electronic device 101 to the front plate 302 of the display 301 to communicate with the external environment through a transparent area. Further, some sensor module 304 may be disposed in the internal space of the electronic device to perform its function without being visually exposed through the front plate 302.

Figure 4:
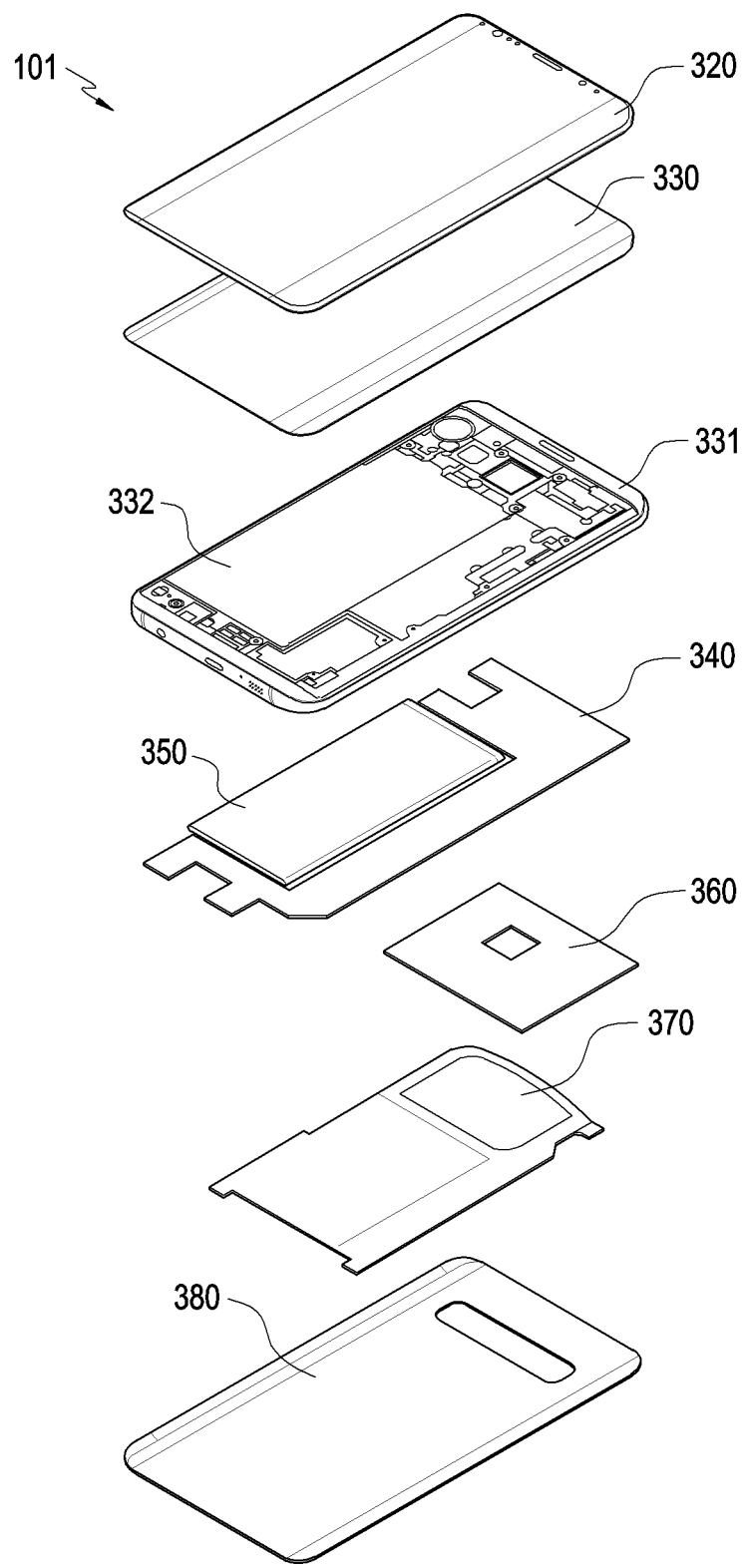
FIG. 4 is an exploded perspective view illustrating the electronic device according to various embodiments of the disclosure.

FIG. 4 is an exploded perspective view illustrating the electronic device according to various embodiments of the disclosure.

Referring to FIG. 4, the electronic device 101 (e.g., the electronic device 101 of FIGS. 1 to 3) according to various embodiments may include a side bezel structure 331 (e.g., the side bezel structure 318 of FIG. 2), a first support member 332, a front plate 320 (e.g., the front plate 302 of FIG. 2), a display 330 (e.g., the display 301 of FIG. 2), the printed circuit board 340 (e.g., a PCB, a flexible PCB (FPCB), or a rigid flexible PCB (RFPCB)), a battery 350 (e.g., the battery 189 of FIG. 1), a second support member 360 (e.g., a rear case), an antenna 370 (e.g., the antenna module 197 of FIG. 1), and a rear plate 380 (e.g., the rear plate 311 of FIG. 2). In a certain embodiment, the electronic device 101 may not be provided with at least one (e.g., the first support member 332 or the second support member 360) of the components or additionally include other components. At least one of the components of the electronic device 101 may be the same as or similar to at least one of the components of the electronic device 101 of FIG. 2 or 3, and a redundant description will be avoided below.

According to various embodiments, the first support member 332 may be disposed inside the electronic device 101, and may be connected to or integrally formed with the side bezel structure 331. The first support member 332 may be formed of, for example, a metal material and/or a non-metal (e.g., polymer) material. The first support member 332 may have the display 330 coupled with one surface thereof and the printed circuit board 340 coupled with the other surface thereof.

According to various embodiments, the printed circuit board 340 may have a processor, memory, and/or an interface mounted thereof. The processor may include, for example, at least one of a CPU, an application processor, a graphics processor, an image signal processor, a sensor hub processor, or a communication processor. According to various embodiments, the printed circuit board 340 may include an FPCB-type radio frequency cable (FRA). For example, the printed circuit board 340 may be disposed on at least part of the first support member 332, and electrically connected to an antenna module (e.g., the antenna module 197 in FIG. 1) and a communication module (e.g., in FIG. 1).

According to various embodiments, the memory may include, for example, volatile memory or non-volatile memory.

According to various embodiments, the interface may include, for example, a high definition multimedia interface (HDMI), a universal serial bus (USB) interface, an SD card interface, and/or an audio interface. The interface may, for example, electrically or physically connect the electronic device 101 to an external electronic device, and include a USB connector, an SD card/MMC connector, or an audio connector.

According to various embodiments, the battery 350 is a device for supplying power to at least one component of the electronic device 101, and may include, for example, a non-rechargeable primary battery, or a rechargeable secondary battery, or a fuel cell. At least part of the battery 350 may be disposed substantially on the same plane as the printed circuit board 340, for example. The battery 350 may be integrally disposed inside the electronic device 101 or detachably from the electronic device 101.

According to various embodiments, the second support member 360 (e.g., the rear case) may be disposed between the printed circuit board 340 and the antenna 370. For example, the second support member 360 may include one surface with which at least one of the printed circuit board 340 or the battery 350 is coupled, and the other surface with which the antenna 370 is coupled.

According to various embodiments, the antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may, for example, perform short-range communication with an external device or wirelessly transmit and receive power required for charging. In another embodiment, an antenna structure may be formed by part of the side bezel structure 331 and/or part of the first support member 332 or a combination thereof.

According to various embodiments, the rear plate 380 may form at least part of the rear surface (e.g., the second surface 310B of FIG. 3) of the electronic device 101.

Figure 5:
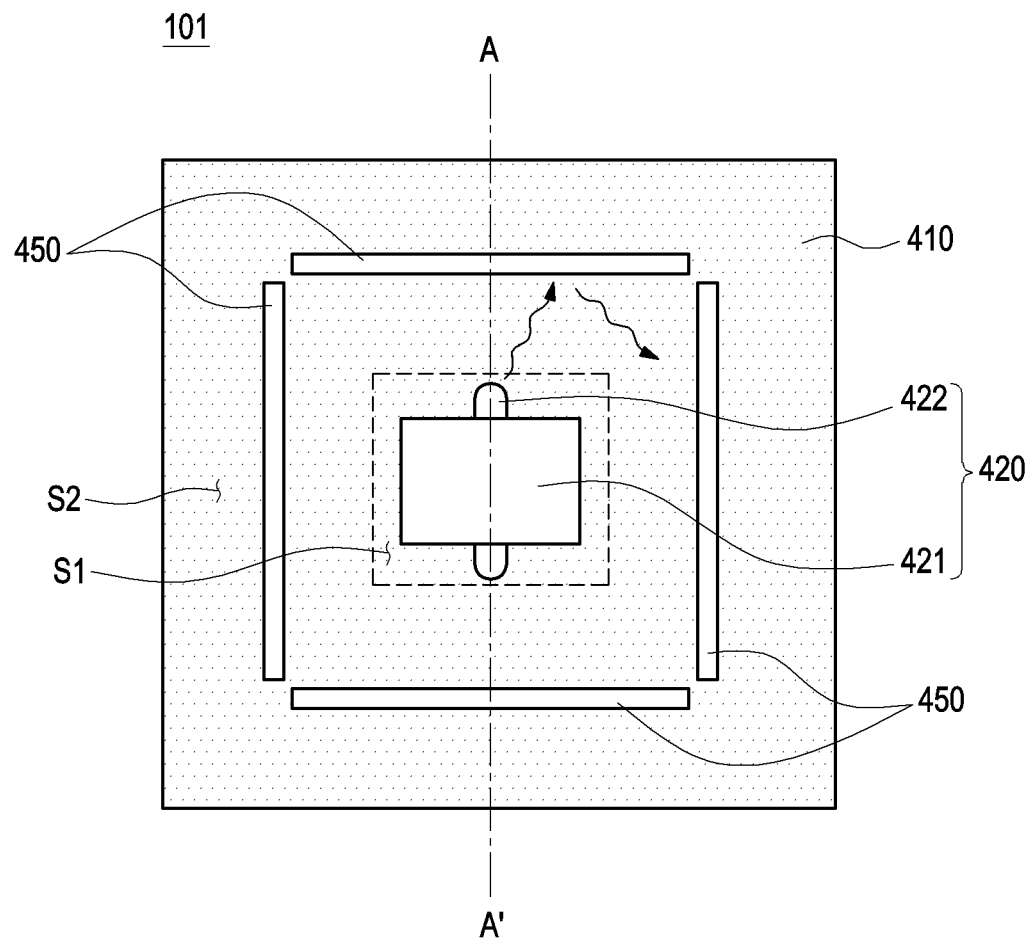
FIG. 5 is a front view illustrating an acoustic actuator and surrounding structures disposed inside an electronic device according to various embodiments of the disclosure.
Figure 6:
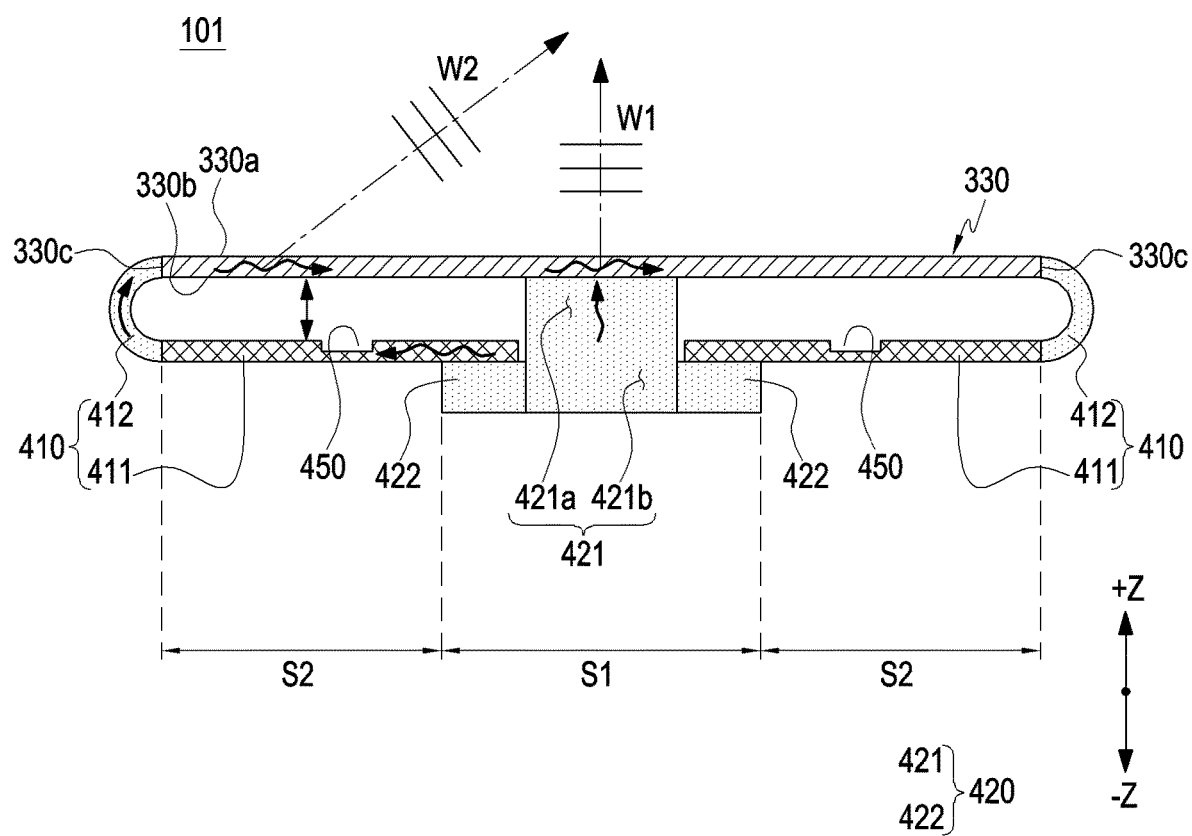
FIG. 6 is a cross-sectional view illustrating the acoustic actuator and the surrounding structures disposed inside the electronic device according to various embodiments of the disclosure.

FIG. 5 is a front view illustrating an acoustic actuator and surrounding structures disposed inside the electronic device according to various embodiments of the disclosure. FIG. 6 is a cross-sectional view illustrating the acoustic actuator and the surrounding structures disposed inside the electronic device according to various embodiments of the disclosure. FIG. 6 is a cross-sectional view taken along a direction A-A' of FIG. 5.

According to various embodiments, the electronic device (e.g., the electronic device 101 of FIGS. 1 to 4) may include the display 330, a bracket 410, an acoustic actuator 420, and a recess structure 450. According to an embodiment, the electronic device 101 may apply sound on display (SOD). SOD, which is a display speaker technology that uses a display panel instead of a diaphragm, may provide a high sound quality to users, and efficiently improves the internal mounting space of an electronic device by removing a separately built-in speaker module. According to an embodiment, the configuration of the bracket 410 of FIG. 5 and the configuration of the display 330 or the bracket 410 of FIG. 6 may be wholly or partially identical to that of the display 330, the side bezel structure 331, or the first support member of FIG. 4.

In FIG. 6, 'Z' may mean a thickness direction of the electronic device 101. In addition, in an embodiment of the disclosure, a '+Z-axis direction' may refer to a front direction (e.g., a first direction) in which the acoustic actuator 420 disposed inside the electronic device 101 faces the display 330, and a '−Z-axis direction' may refer to a rear direction (e.g., a second direction) in which the acoustic actuator 420 disposed inside the electronic device 101 faces opposite to the front direction.

According to various embodiments, the display 330 may include a display panel and a transparent plate protecting the display panel and at least partially exposed to the outside. The display 330 may include a first surface 330a facing in the first direction (+Z-axis direction) and a second surface 330b facing a direction opposite to the first direction (+Z-axis direction). In another example, the display 330 may include side surfaces 330c perpendicular to the first surface 330a and/or the second surface 330b or forming a designated inclination. The side surfaces 330c may form both sides of the display 330 and be connected to the bracket 410.

According to various embodiments, the bracket 410 may support the display 330 and provide a space in which the acoustic actuator 420 and/or a main circuit board is accommodated. For example, the acoustic actuator 420 may be disposed on one surface of the bracket 410, or at least part of the acoustic actuator 420 may be mounted in a recessed area of the bracket 410. In another example, the bracket 410 may include an opening in at least a partial area, and the acoustic actuator 420 may be disposed such that at least part thereof penetrates the opening.

According to an embodiment, the bracket 410 may include a first part 411 facing the display 330, and a second part 412 extending from the first part 411 and connected to the display 330. For example, the acoustic actuator 420 may be located in an area of the first part 411. According to an non-limiting embodiment, the first part 411 may be configured to include a metal, for example, and the second part 412 may be configured to include a different material such as, for example, plastic. According to another non-limiting embodiment, the first part 411 and the second part 412 may be integrally configured to include the same material.

According to a non-limiting embodiment, the display 330 and the first part 411 of the bracket 410 may be spaced apart from each other. For example, the spacing may be an air gap filled with air for a designated distance such that a partial area of the display 330 vibrates (e.g., up and down) (e.g., in the first direction (+Z-axis direction) and the second direction (−Z-axis direction)). In another example, at least part of the spaced part may be filled with a form such as sponge in order to protect the second surface 330b of the display 330 from an impact.

According to an embodiment, the bracket 410 may include a path along which at least a portion of acoustic waves generated from the acoustic actuator 420 travels. For example, the acoustic waves generated from the acoustic actuator 420 may be transmitted to the outside through the first part 411 and the second part 412, and then a surface of the display 330.

According to various embodiments, the acoustic actuator 420 may be disposed under the display 330 and located in an area of the bracket 410. The acoustic actuator 420 may include a vibration part 421 for transmitting waves (e.g., sound waves or more generally referred to as acoustic waves) to the display 330, and a fixed part 422 which is at least partially fixed by the bracket 410. The vibration part 421 of the acoustic actuator 420 may include a magnet, a plate supporting the magnet, a pole formed to protrude from a partial area of the plate, and a coil which is disposed to surround the pole and to which current for sound generation is applied. The above structure for the vibration part 421 of the acoustic actuator 420 may be modified to any of various equivalent configurations to implement waves of the acoustic actuator 420 according to the disclosure.

According to an embodiment, the vibration part 421 of the acoustic actuator 420 may include a first vibration part 421a facing the display 330 and a second vibration part 421b. At least part of the first vibration part 421a may be disposed in contact with the display 330. Accordingly, waves generated from the vibration part 421 may be directly transmitted toward the display 330. An outer side of the second vibration part 421b may be connected to the fixed part 422. The first vibration part 421a and the second vibration part 421b may be integrally formed.

According to an embodiment, the fixed part 422 of the acoustic actuator 420 may extend from the vibration part 421 and be coupled with the bracket 410. Some of waves generated from the vibration part 421 may be transmitted to the fixed part 422, and then to the bracket 410 from an end (e.g., a fixed point) of the fixed part 422. The transmitted waves may be propagated to the display 330 through the first part 411 and the second part 412 of the bracket 410. The vibration part 421 and the fixed part 422 of the acoustic actuator 420 may be integrally formed.

According to an embodiment, at least part of the area of the bracket 410 in which the acoustic actuator 420 is mounted may be opened, and the vibration part 421 of the acoustic actuator 420 may be disposed to penetrate the opened part. For example, the first vibration part 421*a* of the vibration part 421 may be disposed to penetrate the bracket 410 and contact the second surface 330*b* of the display 330, and the second vibration part 421*b* of the vibration part 421 may be located under the bracket 410. According to another embodiment, the fixed part 422 of the acoustic actuator 420 may extend from the second vibration part 421*b* of the vibration part 421 to be coupled with the bottom surface of the bracket 410. One or more fixed parts 422 may be formed to fix the acoustic actuator 420 to the bracket 410.

According to various embodiments, the at least one recess structure 450 may be spaced apart from the acoustic actuator 420 by a designated distance, and formed to have an acoustic impedance different from an acoustic impedance of the bracket 410 adjacent to the recess structure 450 or an acoustic impedance generated from an end of the fixed part 422 of the acoustic actuator 420. For example, the acoustic impedance of the recess structure 450 may be less than the acoustic impedance of the bracket 410 and/or the fixed part 422.

According to an embodiment, the acoustic actuator 420 and the recess structure 450 may be located in the first part 411 of the bracket 410. For example, the acoustic actuator 420 may be located in a first area S1 forming the vicinity of the center of the first part 411 or located to pass through the opening formed in the first area S1, and the recess structure 450) may be located in a second area S2 disposed to at least partially surround the first area S1.

According to an embodiment, the recess structure 450 may have the same thickness (e.g., cross-sectional area) as the adjacent bracket 410, and form a different medium from the adjacent bracket 410. For example, the recess structure 450 may be formed in any one shape of a slit, an opening, a hole, and a groove in a propagation path of waves generated by the acoustic actuator 420 (e.g., between the fixed part 422 and the bracket 410), and change the acoustic impedance. The inside of the slit, opening, hole or groove may be filled with air or rubber, or at least partially filled with a medium (a medium having an acoustic impedance less than that of a metal or plastic) different from that of the bracket 410.

According to an embodiment, the recess structure 450 may be formed to have the same medium as and a different thickness (e.g., cross-sectional area) from the adjacent bracket 410. For example, when the recess structure 450 has a smaller thickness than the bracket 410, the recess structure 450 may exhibit a larger acoustic impedance.

According to an embodiment, the difference between the acoustic impedances of the recess structure 450 and the bracket 410 may change the amount of waves reaching the recess structure 450. As the difference between the acoustic impedances of the recess structure 450 and the bracket 410 increases, more waves than reaching and being transmitted through the recess structure may be reflected from the recess structure 450, and the reflection may increase the wave propagation path to the display 330 and cause energy loss at the same time.

According to an embodiment, some (e.g., a first wave W1) of waves generated by the acoustic actuator 420 may be directly transmitted to the outside through the front surface of the display 330, and other waves (e.g., a second wave W2) may be transmitted to the outside through the front surface of the display 330 after passing through the bracket 410. The second wave W2 propagated through the bracket 410 may cause destructive interference with the first wave W1 directly passing through the front surface of the display 330, thereby lowering a sound pressure level. According to an embodiment of the disclosure, when at least some (e.g., the second wave W2) of waves propagated through the bracket 410 reaches an interface of the recess structure 450, the recess structure 450 may cause transmission, refraction, and/or reflection due to the acoustic impedance difference, and thus attenuate and disperse the energy of the second wave W2. The second wave W2 with the reduced energy may have a reduced amplitude, thereby limiting the destructive interference and improving an acoustic performance (e.g., sound pressure and/or sound quality).

Figure 7:
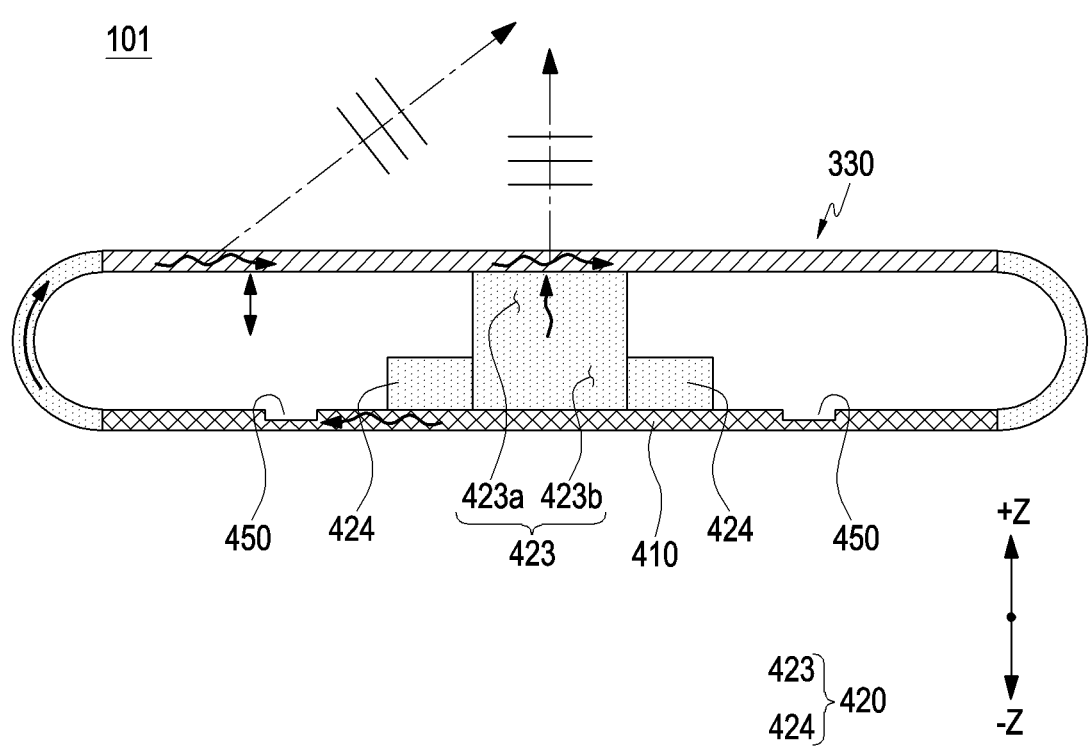
FIG. 7 is a cross-sectional view illustrating an acoustic actuator and surrounding structures disposed inside an electronic device according to another of various embodiments of the disclosure.

FIG. 7 is a cross-sectional view illustrating an acoustic actuator and surrounding structures disposed inside an electronic device according to various embodiments of the disclosure. FIG. 7 illustrates a different embodiment from that of FIG. 6.

According to various embodiments, the electronic device (e.g., the electronic device 101 of FIGS. 1 to 4) may include the display 330, the bracket 410, the acoustic actuator 420, and the recess structure 450. According to an embodiment, the configurations of the display 330, the bracket 410, the acoustic actuator 420, and the recess structure 450 of FIG. 7 may be wholly or partially identical to those of the display 330, the bracket 410, the acoustic actuator 420, and the recess structure 450 of FIG. 6.

An arrangement relationship between the acoustic actuator 420 and the bracket 410, which is a different configuration from that of FIG. 6, will be described below.

According to various embodiments, the bracket 410 may support the display 330 and may provide a space for accommodating the acoustic actuator 420 and/or the main circuit board. For example, the acoustic actuator 420 may be disposed on one surface of the bracket 410 facing the display 330.

According to various embodiments, the acoustic actuator 420 may be disposed between the display 330 and the bracket 410. The acoustic actuator 420 may include a vibration part 423 for transmitting waves (e.g., sound waves or acoustic waves) to the display 330, and a fixed part 424 which is at least partially fixed by the bracket 410.

According to an embodiment, the vibration part 423 of the acoustic actuator 420 may include a first vibration part 423*a* facing the display 330 and a second vibration part 423*b*. At least part of the first vibration part 423*a* may be disposed in contact with the display 330. Accordingly, waves generated in the vibration part 423 may be directly transmitted toward the display 330. The second vibration part 423*b* may be disposed in contact with the bracket 410. The first vibration part 423*a* and the second vibration part 423*b* may be integrally formed.

According to an embodiment, the fixed part 424 of the acoustic actuator 420 may extend from the second vibration part 423*b* and be coupled with the bracket 410. Waves generated from the vibration part 423 may be transmitted to the fixed part 424, and then to the bracket 410 from an end (e.g., a fixed point) of the fixed part 424. The transmitted waves may be propagated to the display 330 through the bracket 410 and the recess structure 450. The vibration part 423 and the fixed part 424 of the acoustic actuator 420 may be integrally formed. In order to fix the acoustic actuator 420 to the bracket 410, the electronic device 101 may implement one or more fixed parts 424.

According to various embodiments, the at least one recess structure 450 may be disposed spaced apart from the acoustic actuator 420 by a specified distance, and formed to have an acoustic impedance less than an acoustic impedance of the bracket 410 adjacent to the recess structure 450 or an acoustic impedance generated at the end of the fixed part 422 of the acoustic actuator 420.

Figure 8:
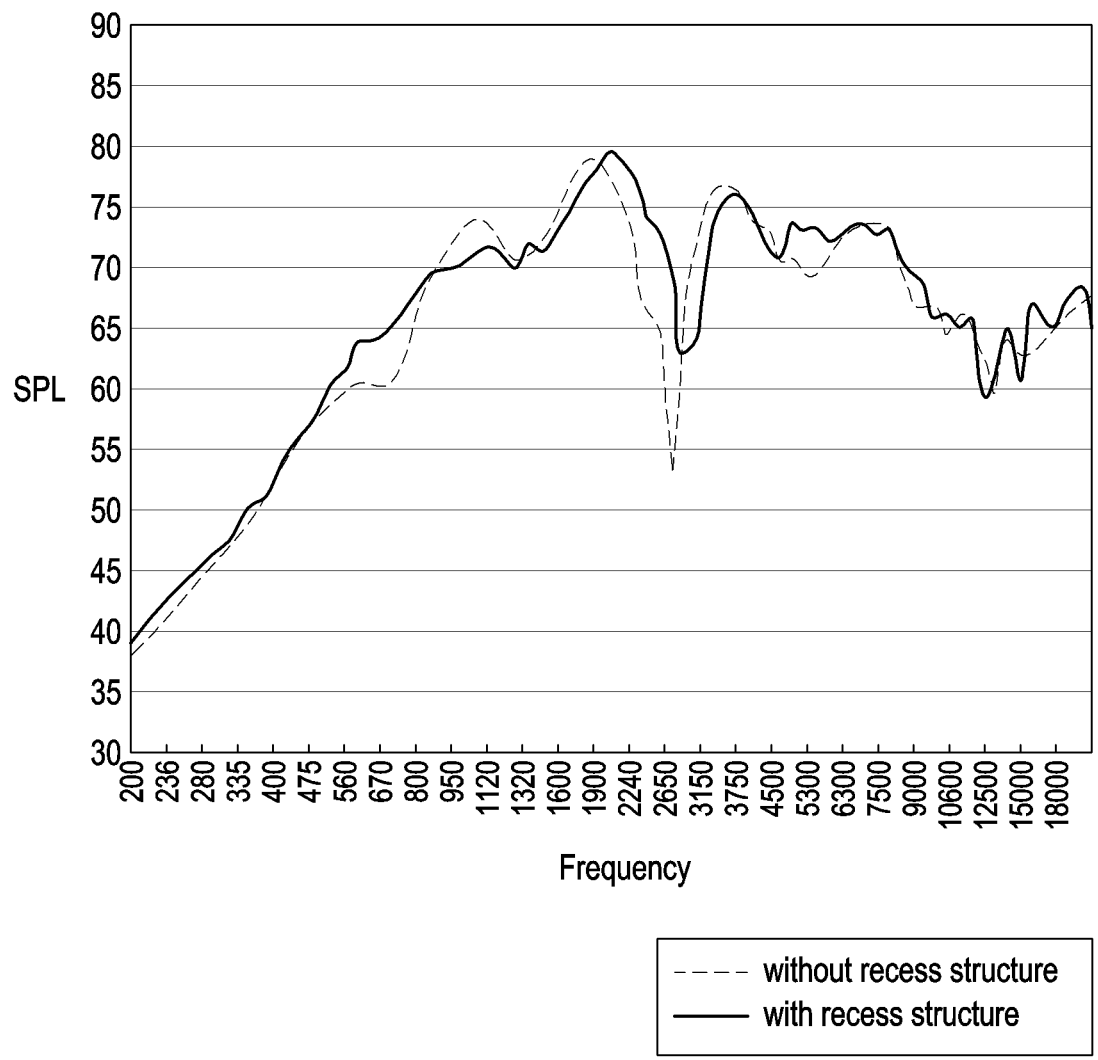
FIG. 8 is a graph comparing an electronic device including a recess structure with a general electronic device without a recess structure according to various embodiments of the disclosure.

FIG. 8 is a graph comparing an electronic device including a recess structure with a general electronic device without a recess structure according to various embodiments of the disclosure.

Referring to FIG. 8, a frequency response characteristic of an electronic device including a recess structure may be identified. In the graph of FIG. 8, the horizontal axis represents frequency bands, and the vertical axis represents sound pressure levels (SPLs). The configuration of the electronic device of FIGS. 5 to 7 may be applied adaptively to the electronic device including the recess structure illustrated in FIG. 8.

It may be noted that compared to an electronic device without a recess structure around an acoustic actuator (hereinafter, referred to as a general electronic device), the electronic device including the recess structure around the acoustic actuator according to an embodiment of the disclosure has a reduced SPL variation in a specific frequency band.

For example, some waves (e.g., a first wave or a first portions of waves) that are excited by the acoustic actuator and propagate into the air through the surface of the display, and the vibration generated by the acoustic actuator are transmitted to the bracket, and some other waves (e.g., a second wave or a second portion of waves) that are generated from the acoustic actuator, transmitted to the bracket, and then propagated into the air through the surface of the display may appear in the general electronic device. The phases of the first waves and the second waves may be different from each other because of their different transmitted media, and the second waves may destructively interfere with the first waves, thus lowering the SPL. Referring to FIG. 8, it may be noted that the SPL is lowered by a rapidly dropping waveform generated in a 3 kHz band and its adjacent bands.

In the electronic device including the recess structure according to an embodiment of the disclosure, the magnitude of the energy of an acoustic wave moving along the bracket from the acoustic actuator may be attenuated and/or dispersed by the recess structure. Accordingly, the first wave is not destructively interfered with by the second wave, and an SPL variation shown in the general electronic device may be reduced. Referring to FIG. 8, it may be noted that the falling waveform generated in the 3 kHz band and its adjacent bands is alleviated by approximately ten decibels (10 dB), compared to the general electronic device.

Figure 9:
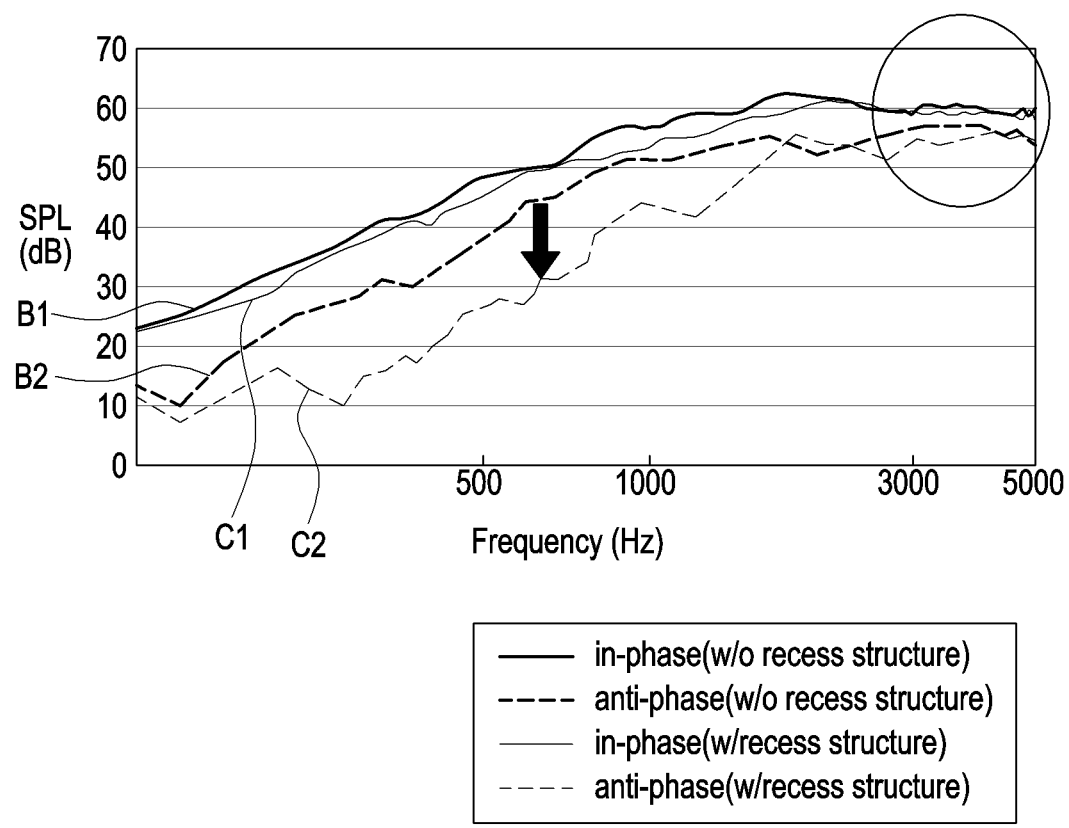
FIG. 9 is another graph comparing an electronic device including a recess structure with a general electronic device without a recess structure according to various embodiments of the disclosure.

FIG. 9 is another graph comparing an electronic device including a recess structure and a general electronic device without a recess structure according to various embodiments of the disclosure.

Referring to FIG. 9, a frequency response characteristic of an electronic device including a recess structure may be identified. In the graph of FIG. 9, the horizontal axis represents frequency bands, and the vertical axis represents SPLs. The configuration of the electronic device of FIGS. 5 to 7 may be applied adaptively to the electronic device including the recess structure illustrated in FIG. 9. A displacement of a display surface may be divided into an in-phase component that contributes to a sound pressure and an anti-phase component that cancels the in-phase component. In the graph, one solid line and one dotted line indicate an in-phase component B1 and an anti-phase component (B2) for the sound pressure of the display surface in an electronic device without a recess structure around an acoustic actuator (hereinafter, referred to a general electronic device). In addition, in the graph, the other solid line and the other dotted line indicate an in-phase component C1 and an anti-phase component C2 for the sound pressure of an electronic device including a recess structure around an acoustic actuator. The SPL level may increase as the in-phase component becomes larger and the anti-phase component becomes smaller.

It may be noted that compared to the general electronic device, the difference in magnitude between the in-phase component and the out-of-phase component increases to increase the SPL in a specific frequency band the electronic device including the recess structure around the acoustic actuator according to an embodiment of the disclosure. As noted from the graph, the destructive interference effect caused by the anti-phase component is important in a frequency band (e.g., the 3 kHz band and its adjacent bands) in which the magnitude difference between the in-phase component and the anti-phase component is small. According to an embodiment, the electronic device including the recess structure may provide an improved SPL, as the anti-phase component is relatively lowered in the 3 kHz band and its adjacent bands, compared to the general electronic device.

Figure 10:
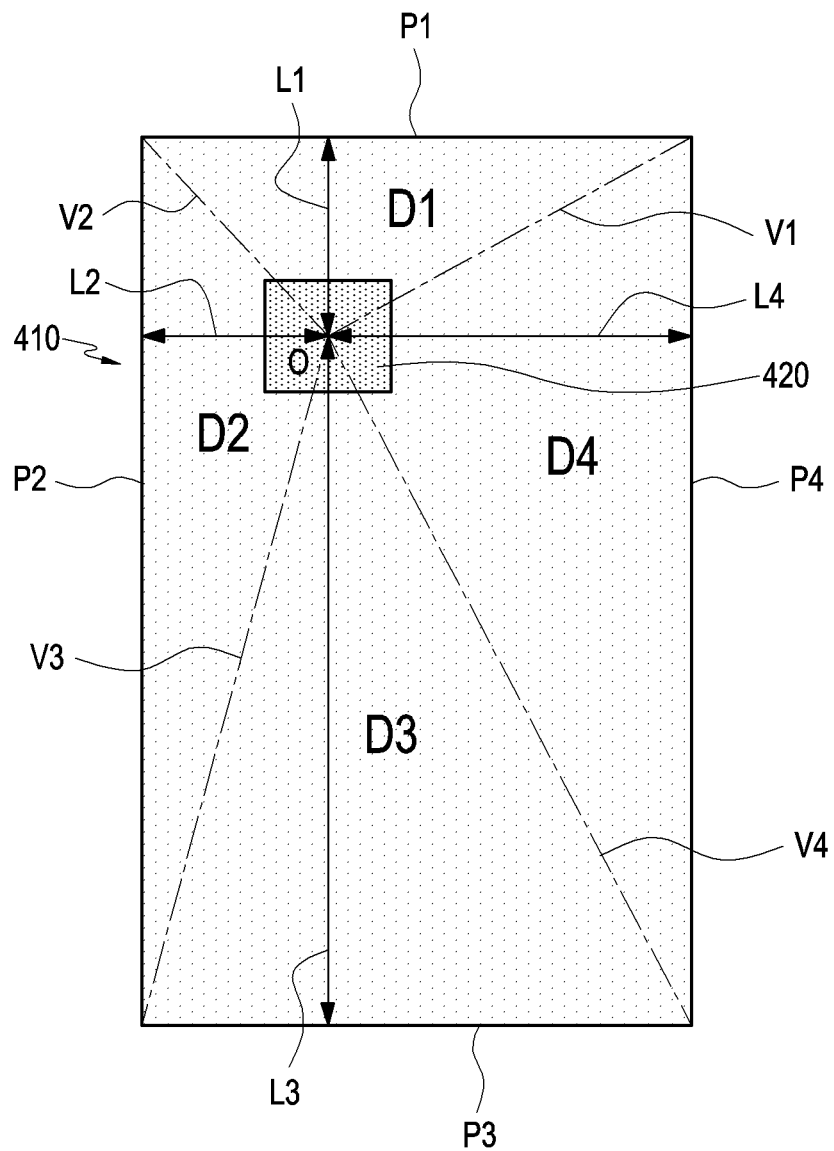
FIG. 10 is a schematic diagram illustrating an acoustic actuator and an area of a surrounding bracket according to various embodiments of the disclosure.
Figure 11:
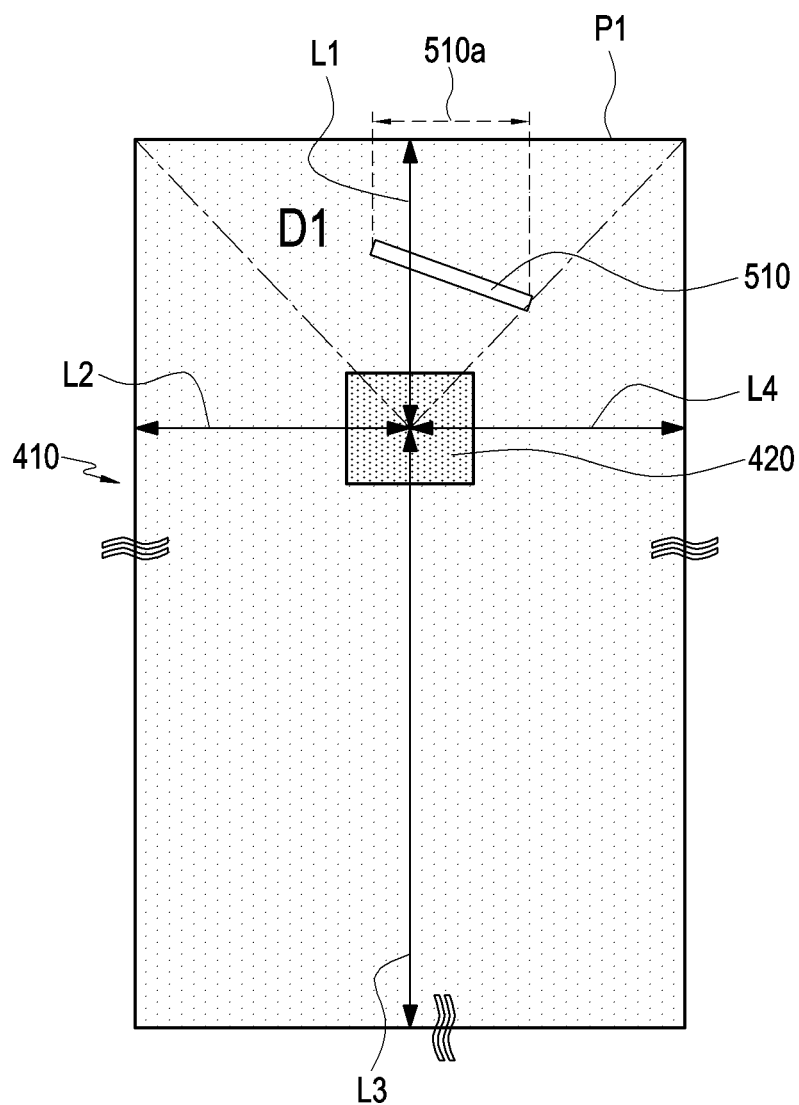
FIG. 11 is a schematic diagram illustrating a position relationship between an acoustic actuator and a recess structure according to one of various embodiments of the disclosure.

FIG. 10 is a diagram illustrating an acoustic actuator and a bracket area around the acoustic actuator according to various embodiments of the disclosure. FIG. 11 is a diagram illustrating a position relationship between an acoustic actuator and a recess structure according to one of various embodiments of the disclosure.

According to various embodiments, an electronic device (e.g., the electronic device 101 of FIGS. 1 to 4) may include the bracket 410, the acoustic actuator 420, and a recess structure 510 (see FIG. 11). According to an embodiment, the configurations of the acoustic actuator 420 and the bracket 410 of FIG. 10, and the configurations of the acoustic actuator 420, the bracket 410, and the recess structure 510 of FIG. 11 may be wholly or partially identical to those of the acoustic actuator 420, the bracket 410, and the recess structure 450 of FIGS. 5 to 7.

Referring to FIG. 10, the acoustic actuator 420 may be disposed in one area of the bracket 410. For example, the one area of the bracket 410 in which the acoustic actuator 420 is disposed may be one surface facing a display (e.g., the display 330 of FIG. 6). In another example, the one area of the bracket 410 in which the acoustic actuator 420 is disposed may be opened or formed in the shape of a groove.

According to various embodiments, vertical distances from the center O of the acoustic actuator 420 to sides forming a rectangular outer frame of the bracket 410 may be designated as a first distance L1, a second distance L2, a third distance L3, and a fourth distance L4, respectively. The first distance L1 may be the shortest of all the distances (e.g., the first distance L1, the second distance L2, or the third distance L3). Virtual lines drawn from the center O of the acoustic actuator 420 toward corners of the rectangular bracket 410 may be defined as a first line V1, a second line V2, a third line V3, and a fourth virtual line V4, respectively.

According to an embodiment, the bracket 410 may include a plurality of areas around the acoustic actuator 420.

A first area D1 may be an area formed by a first side P1 forming the first distance L1, the first line V1, and the second line V2. A second area D2 may be an area formed by a second side P2 forming the second distance L2, the second line V2, and the third line V3. A third area D3 may be an area formed by a third side P3 forming the third distance L3, the third line V3, and the fourth line V4. A fourth area D4 may be an area formed by a fourth side P4 forming the fourth distance L4, the fourth line V4, and the first line V1.

According to an embodiment, the recess structure 510 may be located on or inside the bracket 410, spaced apart from the acoustic actuator 420 by a specified distance. For example, the recess structure 510 may be located in any one of the first area D1, the second area D2, the third area D3, and the fourth area D4. In another example, a plurality of recess structures 510 may be located in at least two of the first area D1, the second area D2, the third area D3, or the fourth area D4. In another example, the recess structure 510 may be located over at least two of the first area D1, the second area D2, the third area D3, or the fourth area D4.

Referring to FIG. 11, an arrangement relationship between the acoustic actuator 420 disposed in a central area of the bracket 410 and a single recess structure 510 spaced apart from the acoustic actuator 420 by a specified distance may be identified. The configuration related to the area and length of the bracket 410 of FIG. 10 may be applied adaptively to the configuration related to the area and length of the bracket 410 of FIG. 11.

According to various embodiments, at least one recess structure 510 may be configured in an area (e.g., the first area D1) having the shortest one (e.g., the first distance) of the first distance L1, the second distance L2, the third distance L3, and the fourth distance L4. The recess structure 510 may be formed in the first area D1 to have a different acoustic impedance from the surrounding bracket 410 or part (e.g., the fixed part 422 of FIG. 6) of the acoustic actuator 420. Acoustic-related impedances may be divided into a specific acoustic impedance and an acoustic impedance. The specific acoustic impedance is an intrinsic property of a medium and defined as the product of the density of the medium and the speed of sound in the medium. The acoustic impedance is defined as a value obtained by dividing a sound pressure on a surface parallel to a wavefront by the volume velocity of a wave passing through the surface, when a sound wave propagates. For example, assuming that the particle velocity of the medium through which the sound wave is transmitted is u, an area parallel to the wavefront of the sound wave is S, and the sound pressure at this time is P, I expressed as $I=P/uS$ is defined as the acoustic impedance. In another example, the acoustic impedance may be defined as a value obtained by dividing the specific acoustic impedance by a cross-sectional area in a specific case.

According to an embodiment, when the recess structure 510 and the bracket 410 are identical in terms of thickness (e.g., cross-sectional area) and different in terms of medium, the acoustic impedance of the recess structure 510 may be different from that of the bracket 410. For example, when the recess structure 510 is shaped into a slit, the recess structure 510 and the bracket 410 may have the same thickness, and may be compared in terms of the specific acoustic impedance. When the bracket 410 is formed of a metal (e.g., aluminum), and the recess structure 510 is formed of a material such as air or rubber, the recess structure 510 may be implemented to have a smaller acoustic impedance than that of the bracket 410.

According to an embodiment, when the recess structure 510 and the bracket 410 are different in terms of thickness (e.g., cross-sectional area) and identical in terms of medium, the acoustic impedance of the recess structure 510 may be different from that of the bracket 410. For example, when the recess structure 510 is formed of aluminum, and the recess structure 510 is formed of an aluminum tape having a relatively small thickness, the recess structure 510 may be implemented to have a larger acoustic impedance than that of the bracket 410. According to an embodiment, when the recess structure 510 and the bracket 410 are different in terms of thickness (e.g., cross-sectional area) and medium, the acoustic impedance of the recess structure 510 may be different from that of the bracket 410. The recess structure 510 having a different acoustic impedance from the bracket 410 may suppress waves generated from the acoustic actuator 420 and thus block the waves from traveling to the bracket 410.

According to an embodiment, when the recess structure 510 and the bracket 410 have the same thickness and different media, the specific acoustic impedance of the recess structure 510 may be designed to be smaller than the specific acoustic impedance of the adjacent bracket 410 or the fixed part of the acoustic actuator 420. For example, the specific acoustic impedance of the recess structure 510 may be smaller than the specific acoustic impedance of the bracket 410 or the fixed part of the acoustic actuator 420 by approximately 20% or less.

According to one embodiment, the recess structure 510 may be designed to have a smaller thickness than the adjacent bracket 410 or the fixed part of the acoustic actuator 420. For example, the thickness of the recess structure 510 may be smaller than the thickness of the bracket 410 or the fixed part by about 20% or less.

According to an embodiment, the recess structure 510 located in the first area D1 may be a structure having a long side in one direction. The long side may be equal to or longer than a half of the size of one side of the acoustic actuator 420. In another example, a virtual long side 510a may be defined as an incident length of the long side in a direction perpendicular to an outer surface (e.g., the first side P1) of the first area D1. The size of the virtual long side 510a may be smaller than the size of the first side P1 included in the first area D1, and may be equal to or larger than a half of the size of one side of the acoustic actuator 420. According to the above embodiment, while the recess structure 510 is disclosed as inclined, the recess structure is not limited thereto in shape, angle, and position and may be designed in various manners.

According to an embodiment, the energy of an acoustic wave excited by the acoustic actuator and transmitted to the bracket 410 may be attenuated and/or dispersed by the recess structure 510 located in a propagation path. As the acoustic wave whose amplitude is reduced by the recess structure 510 becomes weaker in canceling the wave transmitted directly to the outside through the display surface, the acoustic performance of the electronic device may be improved.

Figure 12:
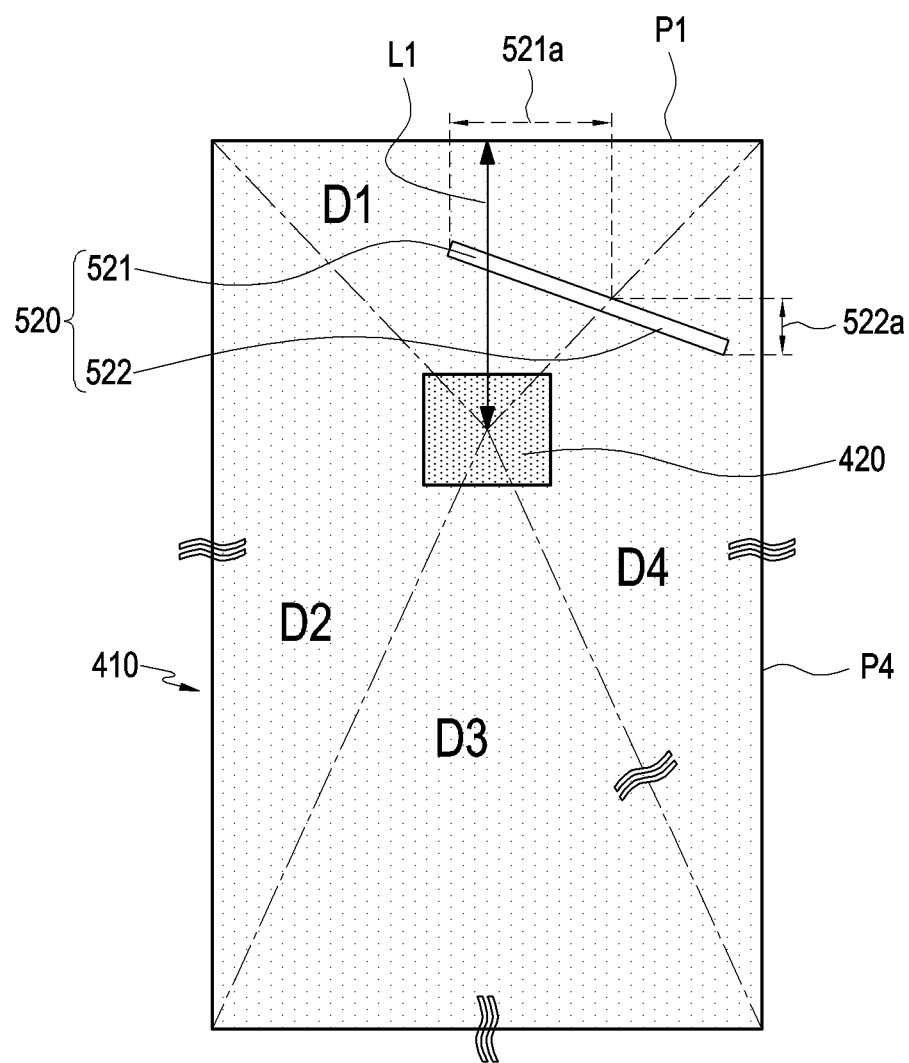
FIG. 12 is a schematic diagram illustrating a position relationship between an acoustic actuator and a recess structure according to another of various embodiments of the disclosure.

FIG. 12 is a diagram illustrating a position relationship between an acoustic actuator and a recess structure according to another of various embodiments of the disclosure.

According to various embodiments, an electronic device (e.g., the electronic device 101 of FIGS. 1 to 4) may include the bracket 410, the acoustic actuator 420, and a recess structure 520. According to an embodiment, the configurations of the acoustic actuator 420, the bracket 410, and the recess structure 520 of FIG. 12 may be wholly or partially identical to those of the acoustic actuator 420, the bracket 410, and the recess structure 450 of FIGS. 5 to 7.

Referring to FIG. 12, an arrangement relationship of the acoustic actuator 420 disposed in the central area of the bracket 410 and one recess structure 520 spaced apart from the acoustic actuator 420 by a specified distance may be identified. The configuration related to the area and length of the bracket 410 of FIGS. 10 and 11 may be applied adaptively to the configuration related to the area and length of the bracket 410 of FIG. 12. Unlike the recess structure 510 of FIG. 11, the recess structure 520 of FIG. 12 may be located over a plurality of areas of the bracket 410.

According to various embodiments, the recess structure 520 may be located over a plurality of areas among the first area D1, the second area D2, the third area D3, and the fourth area D4. The recess structure 520 may be located in at least one other area (e.g., the second area D2, the third area D3, and/or the fourth area D4) in addition to the area (e.g., the first area D1) having the shortest distance (e.g., the first distance L1). For example, the recess structure 520 may be a structure having a long side in one direction, and the long side may be located over the first area D1 and the fourth area D4.

According to an embodiment, the recess structure 520 may include a first part 521 located in the first area D1 and a second part 522 extending from the first part 521 and located in the fourth area D4. The size of the long side may be equal to or larger than a half of the size of one side of the acoustic actuator 420. In another example, a virtual long side 521a of the first part 521 may be defined as an incident length of the long side of the first part 521 incident in a direction perpendicular to the outer surface (e.g., the first side P1) of the first area DE A virtual long side 522a of the second part 522 may be defined as an incident length of the long side of the second part 522 in a direction perpendicular to the outer surface (e.g., the fourth side P4) of the fourth area D4. The size of the virtual long side 521a of the first part 521 may be smaller than the size of the first side P1 included in the first area D1, and may be equal to or larger than a half of the size of one side of the acoustic actuator 420. The size of the virtual long side 522a of the second part 522 may be smaller than the size of the fourth side P4 included in the fourth area D1, and may be equal to or larger than a half of the size of one side of the acoustic actuator 420.

According to an embodiment, the energy of an acoustic wave excited by the acoustic actuator and transmitted to the bracket 410 may be attenuated and/or dispersed by the recess structure 510 located in a propagation path. As the acoustic wave whose amplitude is reduced by the recess structure 520 becomes weaker in canceling the wave transmitted directly to the outside through the display surface, the acoustic performance of the electronic device may be improved.

Figure 13:
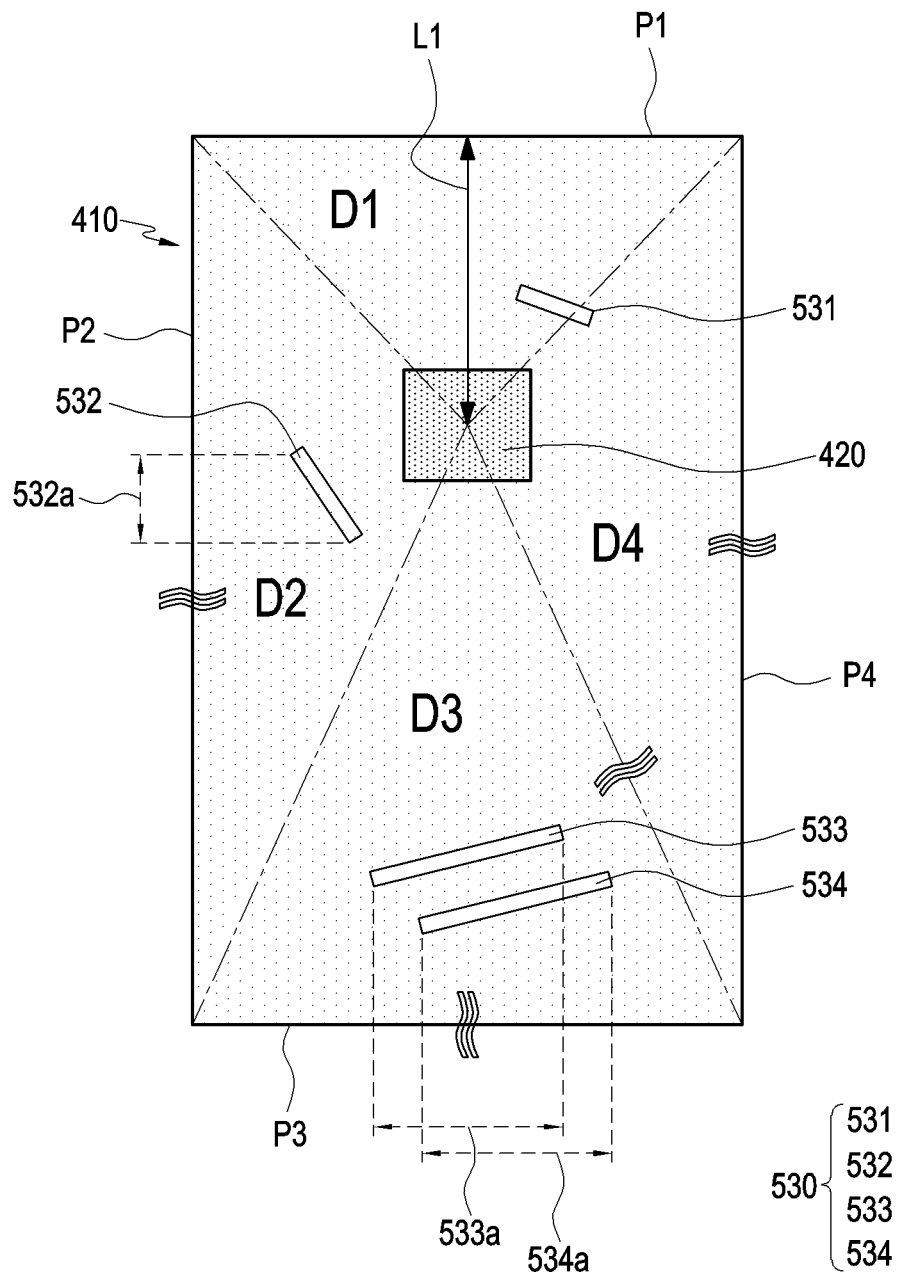
FIG. 13 is a schematic diagram illustrating a position relationship between an acoustic actuator and a recess structure according to another of various embodiments of the disclosure.

FIG. 13 is a diagram illustrating a position relationship between an acoustic actuator and a recess structure according to another of various embodiments of the disclosure.

According to various embodiments, an electronic device (e.g., the electronic device 101 of FIGS. 1 to 4) may include the bracket 410, the acoustic actuator 420, and recess structures 530. According to an embodiment, the configurations of the acoustic actuator 420, the bracket 410, and the recess structures 530 of FIG. 13 may be wholly or partially identical to those of the acoustic actuator 420, the bracket 410, and the recess structure 450 of FIGS. 5 to 7.

Referring to FIG. 13, an arrangement relationship of the acoustic actuator 420 disposed in the central area of the bracket 410 and a plurality of recess structures 530 spaced apart from the acoustic actuator 420 by specified distances may be identified. The configuration related to the area and length of the bracket 410 of FIGS. 10 to 12 may be applied adaptively to the configuration related to the area and length of the bracket 410 of FIG. 13. Unlike the recess structure 450 of FIGS. 11 and 12, the recess structures 530 of FIG. 13 may include a plurality of separated recess structures 450.

According to various embodiments, the recess structures 530 may be located over a plurality of areas among the first area D1, the second area D2, the third area D3, and the fourth area D4. The recess structures 530 may be located in at least one other area (e.g., the second area D2, the third area D3, and/or the fourth area D4) in addition to the area (e.g., the first area D1) having the shortest distance (e.g., the first distance L1). For example, the recess structures 530 may include a first recess structure 531 located over the first area D1 and the fourth area D4, a second recess structure 532 located in the second area D2, and a third recess structure 532 and a third recess structure 534 located in the third area D3. The configuration of the recess structure 520 of FIG. 12 may be applied adaptively to that of the first recess structure 531.

According to an embodiment, each of the second recess structure 532, the third recess structure 533, and the fourth recess structure 534 may be a structure having a long side in one direction, and the long sides may have different sizes. For example, a long side farther from the acoustic actuator 420 may be larger than a long side nearer to the acoustic actuator 420.

According to an embodiment, the sizes of the long sides may be equal to or larger than a half of the size of one side of the acoustic actuator 420. In another example, a virtual long side 532a of the second recess structure 532 may be defined as an incident length of the long side of the second recess structure 532 in a direction perpendicular to the outer surface (e.g., the second side P2) of the second area D2. The size of the virtual long side 532a of the second recess structure 532 may be smaller than the size of the second side P2 included in the second area D2, and may be equal to or larger than a half of the size of one side of the acoustic actuator 420. The second recess structure 532 may be located closer to the acoustic actuator 420 than the third recess structure 533 and the fourth recess structure 534, and have a smaller long side than those of the third recess structure 533 and the fourth recess structure 534.

According to an embodiment, the sizes of virtual long sides 533a and 534a of the third recess structure 533 and the fourth recess structure 534 may be defined as incident lengths of the long sides of the third recess structure 533 and the fourth recess structure 534 in a direction perpendicular to the outer surface (e.g., the third side P3) of the third area D3, respectively. The size of each of the virtual long sides 533a and 534a may be smaller than the size of the third side P3 included in the third area D3, and may be equal to or larger than a half of the size of one side of the acoustic actuator 420. The third recess structure 533 may be located farther from the acoustic actuator 420 than the second recess structure 532 and nearer to the acoustic actuator 420 than the fourth recess structure 534. The long side of the third recess structure 533 may be larger than that of the second recess structure 532 and smaller than that of the fourth recess structure 534.

According to an embodiment, energy of the acoustic wave(s) excited by the acoustic actuator and transmitted to the bracket 410 may be attenuated and/or dispersed by the plurality of recess structures 530 positioned on the propagation path. As the acoustic wave whose amplitude is reduced by the recess structures 530 becomes weaker in canceling the wave transmitted directly to the outside through the display surface, the acoustic performance of the electronic device may be improved.

According to an embodiment, a plurality of acoustic actuators 420 may be configured, and the recess structures 530 may be located between the plurality of actuators to attenuate energy.

Figure 14:
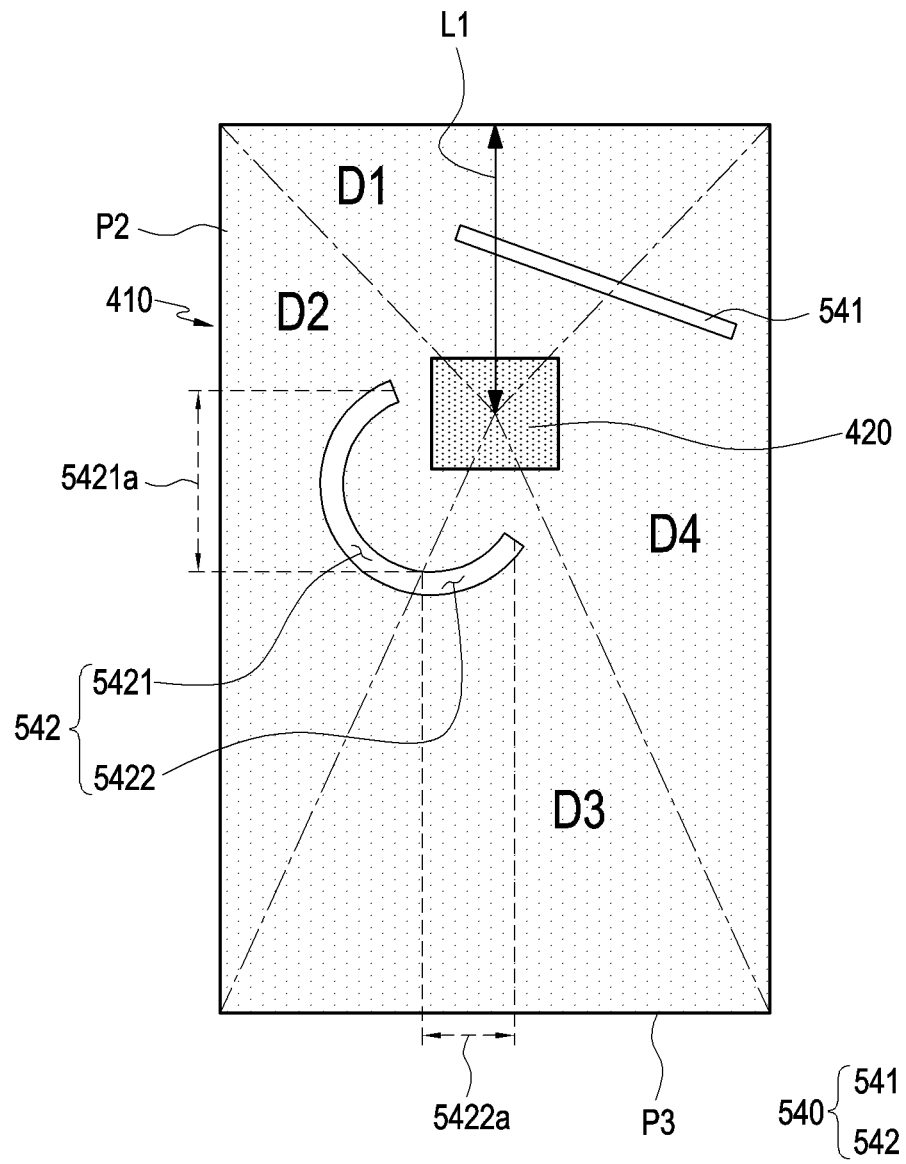
FIG. 14 is a schematic diagram illustrating a position relationship between an acoustic actuator and a recess structure according to another of various embodiments of the disclosure.

FIG. 14 is a diagram illustrating a position relationship between an acoustic actuator and a recess structure according to another of various embodiments of the disclosure.

According to various embodiments, an electronic device (e.g., the electronic device 101 of FIGS. 1 to 4) may include the bracket 410, the acoustic actuator 420, and recess structures 540. According to an embodiment, the configurations of the acoustic actuator 420, the bracket 410, and the recess structures 540 of FIG. 14 may be wholly or partially identical to those of the acoustic actuator 420, the bracket 410, and the recess structure 450 of FIGS. 5 to 7.

Referring to FIG. 14, an arrangement relationship of the acoustic actuator 420 disposed in the central area of the bracket 410 and a plurality of recess structures 540 spaced apart from the acoustic actuator 420 by specified distances may be identified. The configuration related to the area and length of the bracket 410 of FIGS. 10 to 12 may be applied adaptively to the configuration related to the area and length of the bracket 410 of FIG. 14. Unlike the recess structures 520 and 530 of FIGS. 12 and 13, the recess structures 540 of FIG. 14 may include a plurality of separated recess structures including at least one structure forming a curved surface.

According to various embodiments, the recess structures 540 may be located over a plurality of areas among the first area D1, the second area D2, the third area D3, and the fourth area D4. The recess structures 540 may be located in at least one other area (e.g., the second area D2, the third area D3, and/or the fourth area D4) in addition to the area (e.g., the first area D1) having the shortest distance (e.g., the first distance L1). For example, the recess structures 540 may include a first recess structure 541 located over the first area D1 and the fourth area D4, and a second recess structure 542 located over the second area D2 and the third area D3. The configuration of the recess structure 520 of FIG. 12 may be applied adaptively to that of the first recess structure 541.

According to an embodiment, the second recess structure 542 may include a second part 5422 extending from a first part 5421 located in the second area D2 to the third area D3, and the first part 5421 and the second part 5422 may be implemented to be concave toward the acoustic actuator 420, in a curved shape. A virtual long side 5421*a* of the first part 5421 may be defined as an incident length of the long side of the first part 5421 in a direction perpendicular to the outer surface (e.g., the second side P2) of the second area D2. A virtual long side 5422*a* of the second part 5422 may be defined as an incident length of the long side of the first part 5421 in a direction perpendicular to the outer surface (e.g., the third side P3) of the third area D3. The size of the virtual long side 5421*a* of the first part 5421 may be smaller than the size of the second side P2 included in the second area D2, and may be equal to or larger than a half of the size of one side of the acoustic actuator 420. The size of the virtual long side 5422*a* of the second part 5422 may be smaller than the size of the third side P3 included in the third area D3, and may be equal to or larger than a half of the size of one side of the acoustic actuator 420.

According to an embodiment, energy of the acoustic wave excited by the acoustic actuator and transmitted to the bracket 410 may be attenuated and/or dispersed by the plurality of recess structures 540 positioned on the propagation path. As the acoustic wave whose amplitude is reduced by the recess structures 540 becomes weaker in cancelling the wave transmitted directly to the outside through the display surface, the acoustic performance of the electronic device may be improved.

Figure 15:
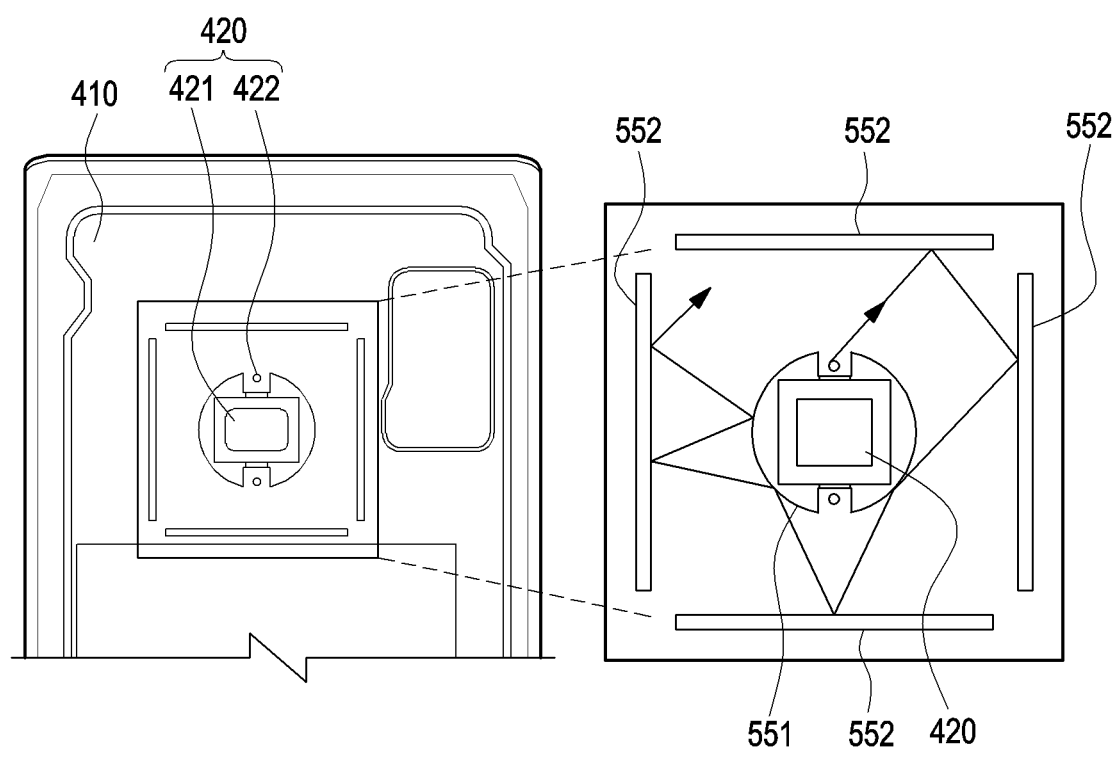
FIG. 15 is a front view illustrating a position relationship between an acoustic actuator and a recess structure according to another of various embodiments of the disclosure.

FIG. 15 is a front view illustrating a position relationship between an acoustic actuator and a recess structure located in a bracket according to another of various embodiments of the disclosure.

According to various embodiments, an electronic device (e.g., the electronic device 101 of FIGS. 1 to 4) may include the bracket 410, the acoustic actuator 420, and a recess structure 550. According to an embodiment, the configurations of the acoustic actuator 420, the bracket 410, and the recess structure 550 of FIG. 15 may be wholly or partially identical to those of the acoustic actuator 420, the bracket 410, and the recess structure 450 of FIGS. 5 to 7.

Referring to FIG. 15, the acoustic actuator 420 may be disposed in one area of the bracket 410. For example, the one area of the bracket 410 in which the acoustic actuator 420 is disposed may be one surface facing a display (e.g., the display 330 of FIG. 6). In another example, the one area of the bracket 410 in which the acoustic actuator 420 is disposed may be opened or formed in the shape of a groove.

According to various embodiments, the acoustic actuator 420 may include the vibration part 421 for generating vibrations and the fixed part 422 for fixing the acoustic actuator 420 to the bracket 410. The recess structure 540 may include a first recess structure 551 disposed adjacent to the acoustic actuator 420 and a second recess structure 552 spaced apart from one end of the fixed part 422 by a specified distance, in correspondence with distances to the acoustic actuator 420.

According to an embodiment, the first recess structure 551 may be a structure formed to surround the acoustic actuator 420 in the vicinity and including a curved surface. For example, at least part of the first recess structure 551 may be formed to contact the acoustic actuator 420 and provide a circular structure. In another example, at least part of the first recess structure 551 may be located between the acoustic actuator 420 and the second recess structure 552, and at least some surface thereof may face the acoustic actuator 420. In another example, the first recess structure 551 may be shaped into a chaotic cavity.

According to an embodiment, the second recess structure 552 may be shaped into a rectangle having a long side and located to surround at least part of the acoustic actuator 420 and/or the first recess structure 551. A plurality of second recess structures 552 may be separated or formed integrally.

According to an embodiment, waves generated from the acoustic actuator 420 may cause multiple reflections between the first recess structure 551 and the second recess structure 552. For example, some of waves transmitted from a fixed end of the acoustic actuator 420 to the bracket 410 may cause reflection at the interface of the second recess structure 552, and form multiple reflections, while traveling between the second recess structure 552 and the first recess structure 551. Accordingly, as the energy of an acoustic wave moving to the bracket 410 is attenuated and dispersed by a plurality of recess structures 550 and thus becomes weak in cancelling a wave directly transmitted to the outside through the display surface, the acoustic performance of the electronic device may be improved.

According to various embodiments of the disclosure, an electronic device (e.g., the electronic device 101 of FIGS. 1 to 4) may include a display (e.g., 330 in FIG. 6), a bracket (e.g., 410 in FIG. 6) supporting at least part of the display, an acoustic actuator (e.g., 420 in FIG. 6) disposed under the display, and including a vibration part (e.g., 421 in FIG. 6) for generating waves that are delivered to the display and a fixed part (e.g., 422 in FIG. 6) at least partially fixed by the bracket, and a recess structure (e.g., 450 in FIG. 6) disposed at least partially spaced apart from the acoustic actuator, and formed to have an acoustic impedance different from an acoustic impedance of the bracket adjacent to the recess structure.

According to various embodiments, the vibration part of the acoustic actuator may be disposed in contact with the display, and the bracket and the display facing the bracket may be disposed spaced apart from each other.

According to various embodiments, a part of waves generated from the acoustic actuator may be formed to be transmitted directly to the display and propagated to the outside through a surface of the display, and another part of the waves generated from the acoustic actuator may be formed to pass through the bracket and be transmitted, refracted, and/or reflected at an interface of the recess structure.

According to various embodiments, the recess structure may be formed in a propagation path of waves generated from the acoustic actuator, and energy of the generated waves may be attenuated or dispersed by the recess structure, and reduce an amplitude of waves propagated to the display.

According to various embodiments, the vibration part of the acoustic actuator may be disposed to penetrate a partial area of the bracket, and the fixed part of the acoustic actuator may be formed to extend from the vibration part and coupled with a bottom surface of the bracket.

According to various embodiments, the acoustic actuator may be disposed between the display and the bracket, the vibration part may be disposed in contact with a bottom surface of the display, and the fixed part may be formed to be coupled with a top surface of the bracket.

According to various embodiments, the recess structure may include a structure having a long side in one direction, and the long side may be larger than a half of a length of one side surface of the acoustic actuator.

According to various embodiments, the recess structure may have a thickness smaller than a thickness of the acoustic actuator.

According to various embodiments, the bracket and the display facing the bracket may be spaced apart from each other, and the spacing may form an air gap.

According to various embodiments, the recess structure may be formed to include a different medium from the adjacent bracket, and the recess structure may be formed to have a smaller acoustic impedance than an acoustic impedance generated at an end of the fixed part of the acoustic actuator.

According to various embodiments, a plurality of recess structures may be formed, and arranged in a ring or square structure to surround at least part of the acoustic actuator.

According to various embodiments, the recess structure may include a first recess structure having a first long side in a first direction and spaced apart from the acoustic actuator by a first distance, and a second recess structure having a second long side in a second direction and spaced apart from the acoustic actuator by a second distance. The first distance may be smaller than the second distance, and a size of the first side may be smaller than a size of the second side.

According to various embodiments, at least one of the first recess structure or the second recess structure may include a curved surface concave toward the acoustic impedance to surround at least part of the acoustic actuator.

According to various embodiments, the recess structure may include a first recess structure formed to have a first long side in a first direction, have a first distance in the vicinity of the acoustic actuator, and surround the acoustic actuator, and a second recess structure formed to have a second long side in a second direction, be spaced apart from the acoustic actuator by a second distance, and surround the acoustic actuator and the first recess structure. The recess structure may be formed to allow waves generated from the acoustic actuator to cause multiple reflections between the first recess structure and the second recess structure.

According to various embodiments of the disclosure, an electronic device (e.g., the electronic device 101 of FIGS. 1 to 4) may include a display (e.g., 330 in FIG. 6), a metal bracket (e.g., 410 in FIG. 6) supporting at least part of the display, an acoustic actuator (e.g., 420 in FIG. 6) located in a first area (e.g., S1 in FIG. 6) of the metal bracket, for transmitting waves to the display, and at least one recess structure (e.g., 450 in FIG. 6) located in part of a second area (e.g., S2 in FIG. 6) formed to surround at least part of the first area of the metal bracket, and spaced apart from the acoustic actuator. The recess structure may be formed in a propagation path in which waves generated from the acoustic actuator are directed toward an edge of the metal bracket, and suppress propagation of the generated waves to the edge of the metal bracket.

According to various embodiments, the acoustic actuator may include a vibration part (e.g., 421 in FIG. 6) disposed in contact with the display, and a fixed part (e.g., 422 in FIG. 6) at least partially fixed by the bracket.

According to various embodiments, the metal bracket may be spaced apart from the display, and the spacing may form an air gap.

According to various embodiments, at least part of the first area may be opened to dispose at least part of the acoustic actuator to penetrate the bracket, and the recess structure and the second area adjacent to the recess structure may be formed of different media.

According to various embodiments, the recess structure may be formed to have a smaller acoustic impedance than an acoustic impedance generated from an end of the fixed part of the acoustic actuator or an acoustic impedance of the metal bracket adjacent to the recess structure.

According to various embodiments, the recess structure may include a structure having a long side in one direction, and the long side may be larger than a half of a length of one side surface of the acoustic actuator.

According to various embodiments of the disclosure, a method of generating sound from and electronic device may comprise generating acoustic waves from a vibration part of an acoustic actuator that is disposed under a display of the electronic device; delivering the acoustic waves to the display and a fixed part of a bracket supporting at least a portion of the display, the bracket having a first acoustic impedance; and suppressing propagation of the acoustic waves using a recess structure having a second acoustic impedance different from the first impedance and that is spaced apart from the acoustic actuator. The acoustic waves may be delivered to recess structure and are suppressed therefrom to an edge of the metal bracket.

According to various embodiments, a method of generating sound from and electronic device may comprise propagating the acoustic waves from the edge of the metal bracket to the display, and propagating the acoustic waves from a surface of the display into air external of the electronic device.

According to various embodiments, a method of generating sound from and electronic device may comprise dispersing energy of the generated waves using the recess structure so as to reduce an amplitude of the acoustic waves propagated to the display.

According to various embodiments, a method of generating sound from and electronic device may comprise directly transmitting a first portion of the acoustic waves from the acoustic actuator to the display; propagated the first portion of the acoustic waves from the display to the air; directing a second portion of the acoustic waves generated from the acoustic actuator toward the bracket; passing the second portion of the acoustic waves through the bracket; and performing at least one of transmitting, refracting, and reflecting the second portion of the acoustic waves at an interface of the recess structure.

The above-described electronic device including an acoustic actuator according to various embodiments of the disclosure is not limited to the afore-described embodiments and drawings, and it will be apparent to those skilled in the art that many replacements, modifications, and changes can be made within the technical scope of the disclosure.

What is claimed is:

1. An electronic device comprising:
a display;
a bracket comprising a first part disposed below the display and a second part extending from the first part and supporting at least a part of the display;
an acoustic actuator disposed under the display, the acoustic actuator including a vibration part and a fixed part fixing the vibration part to the first part of the bracket, the vibration part configured to transmit waves to the display and to the fixed part; and
a recess structure formed at the first part of the bracket to extend into the bracket,
wherein the recess structure is disposed between the fixed part of the acoustic actuator and the second part of the bracket, and
wherein the recess structure does not overlap with the fixed part of the acoustic actuator when viewed from above the display.

2. The electronic device of claim 1, wherein the vibration part of the acoustic actuator is disposed in contact with the display, and
whereat the bracket and the display are spaced apart from each other.

3. The electronic device of claim 2, wherein a part of waves generated from the acoustic actuator are transmitted directly to the display and propagated to the outside through a surface of the display, and
wherein another part of the waves generated from the acoustic actuator are passed through the bracket and are transmitted, refracted, and/or reflected at an interface of the recess structure.

4. The electronic device of claim 2, wherein the recess structure is formed in a propagation path of waves generated from the acoustic actuator, and
wherein energy of the generated waves are one or both attenuated and dispersed by the recess structure to reduce an amplitude of waves propagated to the display.

5. The electronic device of claim 2, wherein the vibration part of the acoustic actuator is disposed to penetrate a partial area of the bracket, and wherein the fixed part of the acoustic actuator is formed to extend from the vibration part and to be coupled with a bottom surface of the bracket.

6. The electronic device of claim 2, wherein the acoustic actuator is disposed between the display and the bracket, and
wherein the vibration part is disposed in contact with a bottom surface of the display, and the fixed part is formed to be coupled with a top surface of the bracket.

7. The electronic device of claim 1, wherein the recess structure includes a structure having a long side in one direction, and wherein the long side is larger than a half of a length of one side surface of the acoustic actuator.

8. The electronic device of claim 1, wherein the recess structure has a thickness that is less than a thickness of the acoustic actuator.

9. The electronic device of claim 1, wherein the recess structure and the bracket are formed to have the same medium and different thicknesses.

10. The electronic device of claim 1, wherein the recess structure and the bracket are formed to have the same thickness and different media from each other.

11. The electronic device of claim 1, whereat the bracket and the display facing the bracket are spaced apart from each other thereby forming an air gap.

12. The electronic device of claim 1, wherein the recess structure includes a different medium from the bracket, and
wherein the recess structure is formed to have a smaller acoustic impedance than an acoustic impedance generated at an end of the fixed part of the acoustic actuator.

13. The electronic device of claim 1, wherein a plurality of recess structures are formed and are arranged in one of a ring structure or a square structure to surround at least part of the acoustic actuator.

14. The electronic device of claim 1, wherein the recess structure comprises:
A first recess structure having a first long side extending in a first direction and spaced apart from the acoustic actuator by a first distance; and
a second recess structure having a second long side extending in a second direction and spaced apart from the acoustic actuator by a second distance,
wherein the first distance is less than the second distance, and a size of the first side is less than a size of the second side, and
wherein at least one of the first recess structure and the second recess structure includes a curved surface that is concave toward the acoustic impedance to surround at least part of the acoustic actuator.

15. The electronic device of claim 1, wherein the recess structure comprises:
a first recess structure having a first long side extending in a first direction, having a first distance in the vicinity of the acoustic actuator, and surrounding the acoustic actuator; and
a second recess structure having a second long side in a second direction, spaced apart from the acoustic actuator by a second distance, and surrounding the acoustic actuator and the first recess structure,
wherein the recess structure allows waves generated from the acoustic actuator to cause multiple reflections between the first recess structure and the second recess structure.

16. The electronic device of claim 1,
wherein the first part of the bracket comprises:
a first area fixed to the fixed part of the acoustic actuator; and a second area disposed to at least partially surround the first area, wherein the recess structure is located at the second area.

17. The electronic device of claim 16, wherein at least part of the first area is opened to dispose at least part of the acoustic actuator to penetrate the bracket, and the at least one recess structure and the second area adjacent to the at least one recess structure are formed of different media.

18. The electronic device of claim 16, wherein the at least one recess structure is formed to have a smaller acoustic impedance than an acoustic impedance generated from an end of the fixed part of the acoustic actuator or an acoustic impedance of the metal bracket adjacent to the at least one recess structure.

19. The electronic device of claim 1, wherein the bracket comprises a metal material and forms an air gap between the bracket and the display.

\* \* \* \* \*